(12) United States Patent
Shao

(10) Patent No.: US 12,538,033 B2
(45) Date of Patent: Jan. 27, 2026

(54) AUTOMATIC EXPOSURE METHOD AND ELECTRONIC DEVICE

(71) Applicant: Honor Device Co., Ltd., Shenzhen (CN)

(72) Inventor: Tao Shao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 113 days.

(21) Appl. No.: 18/259,311

(22) PCT Filed: Dec. 21, 2022

(86) PCT No.: PCT/CN2022/140809
§ 371 (c)(1),
(2) Date: Jun. 26, 2023

(87) PCT Pub. No.: WO2023/160190
PCT Pub. Date: Aug. 31, 2023

(65) Prior Publication Data
US 2024/0388805 A1    Nov. 21, 2024

(30) Foreign Application Priority Data
Feb. 28, 2022    (CN) .......................... 202210193699.2

(51) Int. Cl.
*H04N 23/73*      (2023.01)
*H04N 23/12*      (2023.01)
*H04N 23/60*      (2023.01)
*H04N 23/88*      (2023.01)

(52) U.S. Cl.
CPC ............. *H04N 23/73* (2023.01); *H04N 23/12* (2023.01); *H04N 23/64* (2023.01); *H04N 23/88* (2023.01)

(58) Field of Classification Search
CPC .... H04N 23/13; H04N 23/131; H04N 23/133; H04N 23/45; H04N 23/70–741
USPC ........................................................ 348/221.1
See application file for complete search history.

(56) References Cited

U.S. PATENT DOCUMENTS

| 11,526,969 | B2 | 12/2022 | Fan et al. |
| 2015/0103200 | A1 | 4/2015 | Vondran, Jr. et al. |
| 2017/0085800 | A1 | 3/2017 | Wang et al. |
| 2018/0063435 | A1* | 3/2018 | Cho ........................ H04N 23/71 |
| 2020/0228696 | A1 | 7/2020 | Liu et al. |
| 2020/0328242 | A1* | 10/2020 | Peng ..................... H10F 39/803 |
| 2021/0195082 | A1 | 6/2021 | Peng et al. |

(Continued)

FOREIGN PATENT DOCUMENTS

| CN | 108419061 A | 8/2018 |
| CN | 109738068 A | 5/2019 |

(Continued)

*Primary Examiner* — Anthony J Daniels
(74) *Attorney, Agent, or Firm* — Conley Rose, P.C.

(57) ABSTRACT

An automatic exposure method and an electronic device. The device includes an image sensor and a multi-spectral sensor. The method includes: enabling a camera application in the electronic device; acquiring a first image and first data; obtaining a first target lightness of the shooting scene based on the first image; obtaining a target lightness correction amount based on the first data; adjusting the first target lightness based on the target lightness correction amount, to obtain a second target lightness; acquiring a second image; and displaying or saving the second image.

20 Claims, 13 Drawing Sheets

(56) References Cited

U.S. PATENT DOCUMENTS

| | | | |
|---|---|---|---|
| 2022/0030160 A1* | 1/2022 | Hashigami | H04N 23/611 |
| 2022/0392182 A1 | 12/2022 | Tu et al. | |
| 2023/0325999 A1* | 10/2023 | Dong | H04N 23/84 |
| | | | 348/222.1 |

FOREIGN PATENT DOCUMENTS

| | | |
|---|---|---|
| CN | 110708475 A | 1/2020 |
| CN | 111814564 A | 10/2020 |
| CN | 112672069 A | 4/2021 |
| CN | 113163128 A | 7/2021 |
| CN | 113271414 A | 8/2021 |
| CN | 113324491 A | 8/2021 |
| CN | 113676628 A | 11/2021 |
| CN | 113727085 A | 11/2021 |
| CN | 113992863 A | 1/2022 |
| EP | 3893491 A1 | 10/2021 |
| WO | 2019183813 A1 | 10/2019 |
| WO | 2020057199 A1 | 3/2020 |

* cited by examiner

AUTOMATIC EXPOSURE METHOD AND ELECTRONIC DEVICE

CROSS-REFERENCE TO RELATED APPLICATIONS

This application is a national stage of International Application No. PCT/CN2022/140809, filed on Dec. 21, 2022, which claims priority to Chinese Patent Application No. 202210193699.2, filed on Feb. 28, 2022, both of which are incorporated herein by reference in their entireties.

TECHNICAL FIELD

This application relates to the field of terminal devices, and specifically, to an automatic exposure method and an electronic device.

BACKGROUND

With rapid development and wide application of multimedia technologies and network technologies, people use a large amount of image information in daily life and production activities. At present, for different shooting scenes, for example, dim shooting scenes with relatively weak light intensity or particularly bright shooting scenes with relatively strong light intensity, the camera in the electronic device can automatically adjust an exposure time, a gain, and the like of the camera according to the light intensity of the shooting scenes by using an automatic exposure (AE) technology, so that the image captured by the camera will not be excessively dark or excessively bright. However, for some shooting scenes, such as a scene of shooting a solid-color object at a close range, the existing automatic exposure technology may reduce the lightness accuracy of the acquired image. For example, the color of an image acquired during shooting of a black object or a white object is gray.

Therefore, how to adjust an exposure parameter of the camera module to improve the lightness accuracy of the image becomes a problem to be resolved urgently.

SUMMARY

This application provides an automatic exposure method and an electronic device, which can improve the lightness accuracy of an image acquired by an image sensor.

According to a first aspect, an automatic exposure method is provided, applied to an electronic device, where the electronic device includes a first sensor and a second sensor, the first sensor is an image sensor, and the second sensor is a multi-spectral sensor; and the automatic exposure method includes:

enabling a camera application in the electronic device;

acquiring a first image and first data, where the first image is an image acquired by the first sensor based on an initial exposure parameter, the initial exposure parameter corresponds to a shooting scene in which a shot object of the electronic device is located, and the first data is response values of one or more channels of the second sensor;

obtaining a first target lightness of the shooting scene based on the first image;

obtaining a target lightness correction amount based on the first data;

adjusting the first target lightness based on the target lightness correction amount, to obtain a second target lightness;

acquiring a second image, where the second image is an image acquired by the first sensor based on a target exposure parameter, and the target exposure parameter is obtained based on the second target lightness; and displaying or saving the second image.

It should be understood that, the image sensor may also be referred to as an image sensor, which refers to a sensor for imaging.

It should be further understood that, spectral bands that can be received by a multi-spectral sensor include several or more than a dozen bands; and the multi-spectral sensor usually receives a wider range of spectral responses than the image sensor.

With reference to the first aspect, in some implementations of the first aspect, image quality of the second image is higher than image quality of the first image.

It should be further understood that, that image quality of the second image is higher than image quality of the first image may mean that the second image has a higher lightness restoration of the shooting scene; or that image quality of the second image is higher than image quality of the first image means that the lightness accuracy of the second image is higher, or the second image and the first image are evaluated by using an image lightness evaluation algorithm, and the obtained evaluation result is that the image quality of the second image is higher than the image quality of the first image, or the like.

In a possible implementation, by tapping an icon of the "camera" application in the electronic device, a user can instruct the electronic device to enable the camera application.

In a possible implementation, when the electronic device is in a lock screen state, by performing a right-sliding gesture on a display screen of the electronic device, a user can instruct the electronic device to enable the camera application.

In a possible implementation, when the electronic device is in a lock screen state, a lock screen interface includes the icon of the camera application, and by tapping the icon of the camera application, a user instructs the electronic device to enable the camera application.

In a possible implementation, when the electronic device is running another application, the application has a right to invoke the camera application; and by tapping a corresponding control, a user can instruct the electronic device to enable the camera application.

For example, when the electronic device is running an instant messaging application program, by selecting a control of a camera function, a user can instruct the electronic device to enable the camera application.

It should be understood that, the response values of the channels may refer to the response values to the luminous flux of the channels in the shooting scene; or the response values of the channels may refer to the response values of the channels to energy.

In a possible implementation, if the camera application is in a preview state, the second image can be displayed.

In a possible implementation, if the camera application is in a photographing state or a video recording state, the second image can be saved.

In an embodiment of this application, because the image sensor performs light metering according to a target lightness as neutral gray, in some cases, an obtained difference between the target lightness of the shooting scene and an actual lightness of the shooting scene is relatively large, resulting in relatively low lightness accuracy of the image acquired by the image sensor. For example, when performing light metering based on neutral gray, the image sensor cannot accurately distinguish the lightness of a brighter region (for example, a white region) and the lightness of a darker region (for example, a black region) in the shooting scene. For the multi-spectral sensor, because the exposure time of the multi-spectral sensor is a fixed duration, and the all-pass channel in the multi-spectral sensor covers a relatively wide range of bands, the light of each band can be accurately acquired. Therefore, the multi-spectral sensor can obtain the lightness of different shot subjects in the shooting scene, that is, it has the characteristic of "black is dark, and white is bright". Therefore, in this embodiment of this application, the response value of the all-pass channel can be obtained based on the response value of each channel acquired by the multi-spectral sensor in the shooting scene; the lightness correction amount can be obtained based on the response value of the all-pass channel; and the first target lightness of the shooting scene can be corrected according to the lightness correction amount. For example, summation may be performed on the lightness correction amount and the first target lightness to obtain the second target lightness of the shooting scene. For example, if the lightness correction amount is a positive value, it may indicate that the first target lightness of the shooting scene is relatively low, and the second target lightness is obtained by increasing the lightness on the basis of the first target lightness; and if the lightness correction amount is a negative value, it may indicate that the first target lightness of the shooting scene is relatively high, and the second target lightness is obtained by reducing the lightness on the basis of the first target lightness, so that the second target lightness of the shooting scene acquired by the electronic device is more accurate. When the accuracy of the second target lightness of the shooting scene is improved, the accuracy of the target exposure parameter obtained based on the second target lightness is also improved. Therefore, the lightness accuracy of the image acquired by the image sensor based on the target exposure parameter is also improved.

With reference to the first aspect, in some implementations of the first aspect, the obtaining a target lightness correction amount based on the first data includes:
   obtaining the target lightness correction amount based on a response value of a first channel and a mapping relationship, where the first channel refers to an all-pass channel corresponding to the shooting scene, and the mapping relationship is used for representing an association between a lightness correction amount and a response value of the all-pass channel.

In an embodiment of this application, the response value of each channel can be acquired in the shooting scene by the multi-spectral sensor; the target lightness correction amount can be obtained according to the response value of the all-pass channel and a mapping relationship; and the first target lightness of the shooting scene obtained based on the initial exposure parameter can be adjusted based on the target lightness correction amount, to obtain a second target lightness. For example, summation may be performed on the lightness correction amount and the first target lightness to obtain the second target lightness of the shooting scene. For example, if the lightness correction amount is a positive value, it may indicate that the first target lightness of the shooting scene is relatively low, and the second target lightness is obtained by increasing the lightness on the basis of the first target lightness; and if the lightness correction amount is a negative value, it may indicate that the first target lightness of the shooting scene is relatively high, and the second target lightness is obtained by reducing the lightness on the basis of the first target lightness, so that the second target lightness of the shooting scene acquired by the electronic device is more accurate. When the accuracy of the second target lightness of the shooting scene is improved, the accuracy of the target exposure parameter obtained based on the second target lightness is also improved. Therefore, the lightness accuracy of the image acquired by the image sensor based on the target exposure parameter is also improved.

In a possible implementation, the mapping relationship may refer to a functional relationship between the lightness correction amount and the response value of the all-pass channel.

In a possible implementation, the mapping relationship may alternatively refer to a mapping list between the lightness correction amount and the response value of the all-pass channel.

With reference to the first aspect, in some implementations of the first aspect, the first data includes the response value of the first channel.

With reference to the first aspect, in some implementations of the first aspect, the response value of the first channel is obtained by adding the response values of the channels.

In an embodiment of this application, if the first data acquired by the multi-spectral sensor does not include the response value of the first channel, the response values of the channels may be added to obtain the response value of the first channel.

With reference to the first aspect, in some implementations of the first aspect, before the adjusting the first target lightness based on the target lightness correction amount, to obtain a second target lightness, the automatic exposure method further includes:
   determining that the shooting scene remains unchanged.

In an embodiment of this application, because for the same shooting scene, the image sensor cannot accurately distinguish the lighting value of a brighter region (for example, a white region) and the lighting value of a darker region (for example, a black region) in the shooting scene, the lighting value accuracy of the image acquired is relatively low. That is, when the shooting scene has not changed, the first target lightness of the shooting scene needs to be adjusted to obtain the second target lightness with higher lightness accuracy; and if the shooting scene has changed, the automatic exposure algorithm will recalculate the target lightness of the shooting scene. Therefore, whether the current shooting scene has changed needs to be determined before the first target lightness is adjusted.

With reference to the first aspect, in some implementations of the first aspect, the first data is an $N^{th}$ frame of data, and the determining that the shooting scene remains unchanged includes:
   acquiring an average color temperature corresponding to N frames of data and a color temperature corresponding to the $N^{th}$ frame of data;
   obtaining a color temperature difference value based on the average color temperature corresponding to the N frames of data and the color temperature corresponding to the $N^{th}$ frame of data, where the color temperature difference value refers to a difference value between the average color temperature corresponding to the N frames of data and the color temperature corresponding to the $N^{th}$ frame of data; and
   determining, in a case that the color temperature difference value is less than or equal to a preset threshold, that the shooting scene remains unchanged.

In an embodiment of this application, whether the shooting scene has changed may be determined based on the color temperature difference value. If the shooting scene has changed, the color temperature change is relatively large, that is, the color temperature difference value is relatively large; and if the shooting scene has not changed, the color temperature change is relatively small, that is, the color temperature difference value is relatively small.

It should be understood that, one frame of data acquired by the multi-spectral sensor may correspond to one frame of image acquired by the image sensor. For example, if the image sensor acquires the first frame of data, the multi-spectral sensor may acquire one frame of data in the shooting scene.

With reference to the first aspect, in some implementations of the first aspect, the acquiring an average color temperature corresponding to N frames of data and a color temperature corresponding to the $N^{th}$ frame of data includes:
  obtaining the color temperature corresponding to the $N^{th}$ frame of data based on the $N^{th}$ frame of data and calibration color temperature data, where the calibration color temperature data refers to response values of different channels corresponding to color temperature ranges obtained through calibration.

In a possible implementation, the color temperature may be outputted by calibration and matching. For example, the response values of bands corresponding to different color temperatures may be calibrated; it is assumed that the color temperature 500K to 6500K is divided into 10 groups of color temperatures on average, each group of color temperatures may correspond to the response values of a group of bands, and 10 vectors are obtained; and the $N^{th}$ frame of data acquired by the multi-spectral sensor may be fitted with the 10 groups of color temperature calibration values to obtain the color temperature corresponding to the $N^{th}$ frame of data.

With reference to the first aspect, in some implementations of the first aspect, the target exposure parameter includes an exposure time, a light sensitivity, and/or an exposure value.

With reference to the first aspect, in some implementations of the first aspect, the obtaining a first target lightness of the shooting scene based on the first image includes:
  obtaining the first target lightness based on statistical information of the first image, where the statistical information of the first image includes a histogram of the first image, or an average lightness value of regions of the first image.

With reference to the first aspect, in some implementations of the first aspect, the response values of the plurality of channels are the response values of the channels of the second sensor. According to a second aspect, an electronic device is provided. The electronic device includes one or more processors, a memory, a first sensor, and a second sensor, where the first sensor is an image sensor, the second sensor is a multi-spectral sensor, the memory is coupled to the one or more processors, the memory is configured to store computer program code, the computer program code includes computer instructions, and the one or more processors invoke the computer instructions to cause the electronic device to perform the following:
  enabling a camera application in the electronic device;
  acquiring a first image and first data, where the first image is an image acquired by the first sensor based on an initial exposure parameter, the initial exposure parameter corresponds to a shooting scene in which a shot object of the electronic device is located, and the first data is response values of one or more channels of the second sensor;
  obtaining a first target lightness of the shooting scene based on the first image;
  obtaining a target lightness correction amount based on the first data;
  adjusting the first target lightness based on the target lightness correction amount, to obtain a second target lightness;
  acquiring a second image, where the second image is an image acquired by the first sensor based on a target exposure parameter, and the target exposure parameter is obtained based on the second target lightness; and
  displaying or saving the second image.

It should be understood that, the electronic device in this application includes an image sensor and a multi-spectral sensor; and the image sensor may also be referred to as an image sensor, which refers to a sensor for imaging.

It should be further understood that, spectral bands that can be received by a multi-spectral sensor include several or more than a dozen bands; and the multi-spectral sensor usually receives a wider range of spectral responses than the image sensor.

With reference to the second aspect, in some implementations of the second aspect, image quality of the second image is higher than image quality of the first image.

It should be understood that, that image quality of the second image is higher than image quality of the first image means that the second image has a higher lightness restoration of the shooting scene; or that image quality of the second image is higher than image quality of the first image means that the lightness accuracy of the second image is higher, or the second image and the first image are evaluated by using an image lightness evaluation algorithm, and the obtained evaluation result is that the image quality of the second image is higher than the image quality of the first image, or the like.

In a possible implementation, by tapping an icon of the "camera" application in the electronic device, a user can instruct the electronic device to enable the camera application.

In a possible implementation, when the electronic device is in a lock screen state, by performing a right-sliding gesture on a display screen of the electronic device, a user can instruct the electronic device to enable the camera application.

In a possible implementation, when the electronic device is in a lock screen state, a lock screen interface includes the icon of the camera application, and by tapping the icon of the camera application, a user instructs the electronic device to enable the camera application.

In a possible implementation, when the electronic device is running another application, the application has a right to invoke the camera application; and by tapping a corresponding control, a user can instruct the electronic device to enable the camera application.

For example, when the electronic device is running an instant messaging application program, by selecting a control of a camera function, a user can instruct the electronic device to enable the camera application.

It should be understood that, the response values of the channels may refer to the response values to the luminous flux of the channels in the shooting scene; or the response values of the channels may refer to the response values of the channels to energy.

In a possible implementation, if the camera application is in a preview state, the second image can be displayed.

In a possible implementation, if the camera application is in a photographing state or a video recording state, the second image can be saved. In an embodiment of this application, because the image sensor performs light metering according to a target lightness as neutral gray, in some cases, an obtained difference between the target lightness of the shooting scene and an actual lightness of the shooting scene is relatively large, resulting in relatively low lightness accuracy of the image acquired by the image sensor. For example, when performing light metering based on neutral gray, the image sensor cannot accurately distinguish the lightness of a brighter region (for example, a white region) and the lightness of a darker region (for example, a black region) in the shooting scene. For the multi-spectral sensor, because the exposure time of the multi-spectral sensor is a fixed duration, and the all-pass channel in the multi-spectral sensor covers a relatively wide range of bands, the light of each band can be accurately acquired. Therefore, the multi-spectral sensor can obtain the lightness of different shot subjects in the shooting scene, that is, it has the characteristic of "black is dark, and white is bright". Therefore, in this embodiment of this application, the response value of the all-pass channel can be obtained based on the response value of each channel acquired by the multi-spectral sensor in the shooting scene; the lightness correction amount can be obtained based on the response value of the all-pass channel; and the first target lightness of the shooting scene can be corrected according to the lightness correction amount. For example, summation may be performed on the lightness correction amount and the first target lightness to obtain the second target lightness of the shooting scene. For example, if the lightness correction amount is a positive value, it may indicate that the first target lightness of the shooting scene is relatively low, and the second target lightness is obtained by increasing the lightness on the basis of the first target lightness; and if the lightness correction amount is a negative value, it may indicate that the first target lightness of the shooting scene is relatively high, and the second target lightness is obtained by reducing the lightness on the basis of the first target lightness, so that the second target lightness of the shooting scene acquired by the electronic device is more accurate. When the accuracy of the second target lightness of the shooting scene is improved, the accuracy of the target exposure parameter obtained based on the second target lightness is also improved. Therefore, the lightness accuracy of the image acquired by the image sensor based on the target exposure parameter is also improved.

With reference to the second aspect, in some implementations of the second aspect, the one or more processors invoke the computer instructions to cause the electronic device to perform the following step:

obtaining the target lightness correction amount based on a response value of a first channel and a mapping relationship, where the first channel refers to an all-pass channel corresponding to the shooting scene, and the mapping relationship is used for representing an association between a lightness correction amount and a response value of the all-pass channel.

In an embodiment of this application, the response value of each channel can be acquired in the shooting scene by the multi-spectral sensor; the target lightness correction amount can be obtained according to the response value of the all-pass channel and a mapping relationship; and the first target lightness of the shooting scene obtained based on the initial exposure parameter can be adjusted based on the target lightness correction amount, to obtain a second target lightness. For example, summation may be performed on the lightness correction amount and the first target lightness to obtain the second target lightness of the shooting scene. For example, if the lightness correction amount is a positive value, it may indicate that the first target lightness of the shooting scene is relatively low, and the second target lightness is obtained by increasing the lightness on the basis of the target lightness; and if the lightness correction amount is a negative value, it may indicate that the first target lightness of the shooting scene is relatively high, and the second target lightness is obtained by reducing the lightness on the basis of the first target lightness, so that the second target lightness of the shooting scene acquired by the electronic device is more accurate. When the accuracy of the second target lightness of the shooting scene is improved, the accuracy of the target exposure parameter obtained based on the second target lightness is also improved. Therefore, the lightness accuracy of the image acquired by the image sensor based on the target exposure parameter is also improved.

In a possible implementation, the mapping relationship may refer to a functional relationship between the lightness correction amount and the response value of the all-pass channel.

In a possible implementation, the mapping relationship may alternatively refer to a mapping list between the lightness correction amount and the response value of the all-pass channel.

With reference to the second aspect, in some implementations of the second aspect, the first data includes the response value of the first channel.

With reference to the second aspect, in some implementations of the second aspect, the response value of the first channel is obtained by adding the response values of the channels.

In an embodiment of this application, if the first data acquired by the multi-spectral sensor does not include the response value of the first channel, the response values of the channels may be added to obtain the response value of the first channel.

With reference to the second aspect, in some implementations of the second aspect, before the adjusting the first target lightness based on the target lightness correction amount, to obtain a second target lightness, the one or more processors invoke the computer instructions to cause the electronic device to perform the following step:

determining that the shooting scene remains unchanged.

In an embodiment of this application, because for the same shooting scene, the image sensor cannot accurately distinguish the lighting value of a brighter region (for example, a white region) and the lighting value of a darker region (for example, a black region) in the shooting scene, the lighting value accuracy of the image acquired is relatively low. That is, when the shooting scene has not changed, the first target lightness of the shooting scene needs to be adjusted to obtain the second target lightness with higher lightness accuracy; and if the shooting scene has changed, the automatic exposure algorithm will recalculate the target lightness of the shooting scene. Therefore, whether the current shooting scene has changed needs to be determined before the first target lightness is adjusted.

With reference to the second aspect, in some implementations of the second aspect, the one or more processors invoke the computer instructions to cause the electronic device to perform the following steps:

acquiring an average color temperature corresponding to N frames of data and a color temperature corresponding to the $N^{th}$ frame of data;

obtaining a color temperature difference value based on the average color temperature corresponding to the N frames of data and the color temperature corresponding to the $N^{th}$ frame of data, where the color temperature difference value refers to a difference value between the average color temperature corresponding to the N frames of data and the color temperature corresponding to the $N^{th}$ frame of data; and determining, in a case that the color temperature difference value is less than or equal to a preset threshold, that the shooting scene remains unchanged.

In an embodiment of this application, whether the shooting scene has changed may be determined based on the color temperature difference value. If the shooting scene has changed, the color temperature change is relatively large, that is, the color temperature difference value is relatively large; and if the shooting scene has not changed, the color temperature change is relatively small, that is, the color temperature difference value is relatively small.

It should be understood that, one frame of data acquired by the multi-spectral sensor may correspond to one frame of image acquired by the image sensor. For example, if the image sensor acquires the first frame of data, the multi-spectral sensor may acquire one frame of data in the shooting scene.

With reference to the second aspect, in some implementations of the second aspect, the one or more processors invoke the computer instructions to cause the electronic device to perform the following steps:

obtaining the color temperature corresponding to the $N^{th}$ frame of data based on the $N^{th}$ frame of data and calibration color temperature data, where the calibration color temperature data refers to response values of different channels corresponding to color temperature ranges obtained through calibration.

In a possible implementation, the color temperature may be outputted by calibration and matching. For example, the response values of bands corresponding to different color temperatures may be calibrated; it is assumed that the color temperature 500K to 6500K is divided into 10 groups of color temperatures on average, each group of color temperatures may correspond to the response values of a group of bands, and 10 vectors are obtained; and the $N^{th}$ frame of data acquired by the multi-spectral sensor may be fitted with the 10 groups of color temperature calibration values to obtain the color temperature corresponding to the $N^{th}$ frame of data.

With reference to the second aspect, in some implementations of the second aspect, the target exposure parameter includes an exposure time, a light sensitivity, and/or an exposure value.

With reference to the second aspect, in some implementations of the second aspect, the obtaining a first target lightness of the shooting scene based on the first image includes:

obtaining the first target lightness based on statistical information of the first image, where the statistical information of the first image includes a histogram of the first image, or an average lightness value of regions of the first image.

With reference to the second aspect, in some implementations of the second aspect, the response values of the plurality of channels are the response values of the channels of the second sensor.

According to a third aspect, an electronic device is provided, including a module/unit configured to perform the automatic exposure method according to the first aspect or any implementation of the first aspect.

According to a fourth aspect, an electronic device is provided. The electronic device includes one or more processors and a memory, where the memory is coupled to the one or more processors, the memory is configured to store computer program code, the computer program code includes computer instructions, and the one or more processors invoke the computer instructions to enable the electronic device to perform the method according to the first aspect or any implementation of the first aspect.

According to a fifth aspect, a chip system is provided, where the chip system is applied to an electronic device, the chip system includes one or more processors, and the processor invokes a computer instruction to cause the electronic device to perform the method according to the first aspect or any implementation of the first aspect.

According to a sixth aspect, a computer-readable storage medium is provided. The computer-readable storage medium stores computer program code, and when the computer program code is executed by an electronic device, the electronic device is caused to perform the method according to the first aspect or any implementation of the first aspect.

According to a seventh aspect, a computer program product is provided. The computer program product includes computer program code, and when the computer program code is executed by an electronic device, the electronic device is caused to perform the method according to the first aspect or any implementation of the first aspect.

In an embodiment of this application, because the image sensor performs light metering according to a target lightness as neutral gray, in some cases, an obtained difference between the target lightness of the shooting scene and an actual lightness of the shooting scene is relatively large, resulting in relatively low lightness accuracy of the image acquired by the image sensor. For example, when performing light metering based on neutral gray, the image sensor cannot accurately distinguish the lightness of a brighter region (for example, a white region) and the lightness of a darker region (for example, a black region) in the shooting scene. For the multi-spectral sensor, because the exposure time of the multi-spectral sensor is a fixed duration, and the all-pass channel in the multi-spectral sensor covers a relatively wide range of bands, the light of each band can be accurately acquired. Therefore, the multi-spectral sensor can obtain the lightness of different shot subjects in the shooting scene, that is, it has the characteristic of "black is dark, and white is bright". Therefore, in this embodiment of this application, the response value of the all-pass channel can be obtained based on the response value of each channel acquired by the multi-spectral sensor in the shooting scene; the lightness correction amount can be obtained based on the response value of the all-pass channel; and the first target lightness of the shooting scene can be corrected according to the lightness correction amount. For example, summation may be performed on the lightness correction amount and the first target lightness to obtain the second target lightness of the shooting scene. For example, if the lightness correction amount is a positive value, it may indicate that the first target lightness of the shooting scene is relatively low, and the second target lightness is obtained by increasing the lightness on the basis of the first target lightness; and if the lightness correction amount is a negative value, it may indicate that the first target lightness of the shooting scene is relatively high, and the second target lightness is obtained by reducing the lightness on the basis of the first target lightness, so that the second target lightness of the shooting scene acquired by the electronic device is more accurate. When the accuracy of the second target lightness of the shooting scene is improved, the accuracy of the target exposure parameter obtained based on the second target lightness is also improved. Therefore, the lightness accuracy of the image acquired by the image sensor based on the target exposure parameter is also improved.

DESCRIPTION OF EMBODIMENTS

Figure 1:
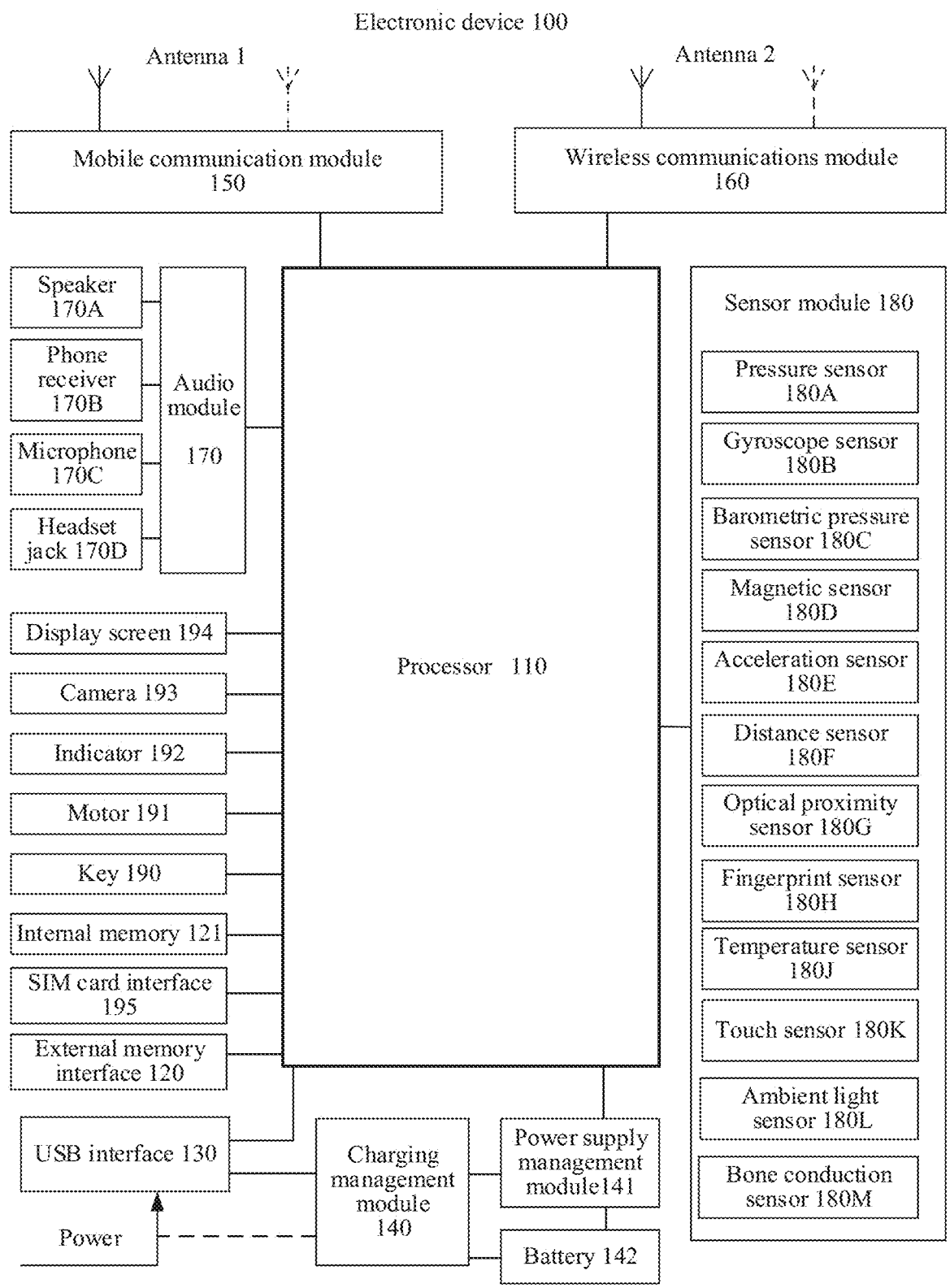
FIG. 1 is a schematic diagram of a hardware system of an electronic device to which this application is applicable.

In an embodiment of this application, the terms such as "first" and "second" mentioned below are used merely for the purpose of description, and shall not be construed as indicating or implying relative importance or implying a quantity of indicated technical features. Therefore, a feature limited by "first" or "second" may explicitly or implicitly include one or more of the features. In the description of the embodiments, unless otherwise stated, "a plurality of" means two or more.

For ease of understanding of the embodiments of this application, related concepts used in the embodiments of this application are briefly described first.

1. Image Sensor

The image sensor may also be referred to as an image sensor, which refers to a sensor for imaging. According to different components, the image sensors may be classified into two main types: charge coupled device (CCD) sensors and complementary metal-oxide semiconductor (CMOS) sensors. Currently, mobile terminals and digital cameras generally use CMOS sensors.

2. Multi-Spectral Sensor spectral bands that can be received by the multi-spectral sensor include several or more than a dozen bands; and the multi-spectral sensor usually receives a wider range of spectral responses than the image sensor, for example, including a visible light spectral band, a near-infrared spectral band, a mid-wave infrared spectral band, and a long-wave infrared spectral band.

3. Automatic Exposure (AE)

The objective of automatic exposure is to achieve an appreciative lightness level or so-called target lightness level in different lighting conditions and scenes, so that the captured video or image is neither excessively dark nor excessively bright. To achieve this objective, a lens aperture, a sensor exposure time, a sensor analog gain, a sensor/ISP digital gain, and the like are adjusted, and this process is referred to as automatic exposure.

It should be understood that, exposure may be represented by multiplying light intensity by a light acting time, where the "light intensity" refers to the intensity of light irradiation on the sensor, that is, illuminance; and the "light acting time" refers to the time for which a photosensitive film is exposed to light, that is, an exposure time. The exposure value is represented by E, and the unit of calculation is lux second. To obtain a certain amount of exposure value, stronger light intensity indicates a shorter exposure time; and weaker light intensity indicates a longer exposure time.

4. Exposure Time

An exposure time is a time interval from opening a shutter to closing the shutter.

5. Shutter (Shutter)

The shutter is an apparatus used in camera equipment to control the time for light irradiation on the photosensitive element, and is an important part of the camera.

6. Exposure Value

The exposure value refers to the integral of the illuminance Ev received by a surface element on the surface of an object within a time t.

7. The Response Value of the all-Pass Channel

The response value of the all-pass channel may be used for representing the lighting value of the all-pass channel; and the all-pass channel refers to all channels covered by the multi-spectral sensor. For example, the spectral bands covered by the multi-spectral sensor include visible light, infrared light, or near-infrared light.

8. Light Sensitivity (ISO)

The light sensitivity is the intensity of incident light sensed by the camera's photosensitive device: charge-coupled device (CCD) or CMOS and a related electronic circuit.

9. Lighting Value (LV)

The lighting value is used for estimating an ambient lightness, and a specific calculation formula thereof is as follows:

$$LV = 10 * \log_2\left(\frac{\text{Aperture}^2}{\text{Exposure}} * \frac{100}{\text{Iso}} * \frac{\text{Luma}}{46}\right);$$

where Exposure represents an exposure time, Aperture represents an aperture size, Iso represents the light sensitivity, and Luma represents an average value of Y of an image in an XYZ space.

10. Dynamic Range (DR) Value

A DR value is used to indicate proportion information of an over-exposure region in a preview image obtained by a main camera module in an entire image.

11. Color Temperature (CT)

By comparing the light color of a light source with the light color radiated by a black body at a certain temperature, when they are consistent, the temperature of the black body at this time is referred to as a color temperature (color temperature) of the light source, and the unit of the color temperature is K.

12. Correlated Color Temperature (CCT)

Some non-black body light sources may be described by the color temperature of their most visually similar black body; this is referred to as their correlated color temperature; the symbol for the correlated color temperature is Tcp; and the unit of the correlated color temperature is K.

It should be understood that, the correlated color temperature may also be referred to as color temperature estimation, or a color temperature estimation value.

The following describes an automatic exposure method and an electronic device in the embodiments of this application with reference to the accompanying drawings.

FIG. 1 shows a hardware system of an electronic device to which this application is applicable.

An electronic device 100 may be a mobile phone, a smart screen, a tablet computer, a wearable electronic device, an in-vehicle device, an augmented reality (AR) device, a virtual reality (VR) device, a notebook computer, an ultra-mobile personal computer (UMPC), a netbook, a personal digital assistant (PDA), a projector, or the like. A specific type of the electronic device 100 is not limited in embodiments of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, and an audio module 170, a speaker 170A, a telephone receiver 170B, a microphone 170C, a headsetjack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that, the structure shown in FIG. 1 does not constitute a specific limitation on the electronic device 100. In some other embodiments of this application, the electronic device 100 may include more or fewer components than those shown in FIG. 1, or the electronic device 100 may include a combination of some of the components shown in FIG. 1, or the electronic device 100 may include sub-components of some of the components shown in FIG. 1. The components shown in FIG. 1 may be implemented by hardware, software, or a combination of software and hardware.

The processor 110 may include one or more processing unit. For example, the processor 110 may include at least one of the following processing units: an application processor (AP), a modem processor, a graphics processing unit (GPU), an image signal processor (ISP), a controller, a memory, a video codec, a digital signal processor (DSP), a baseband processor, and a neural-network processing unit (NPU). Different processing units may be independent components, or may be integrated. The controller may generate an operation control signal according to instruction operation code and a time-sequence signal, and control obtaining and executing of instructions.

A memory may also be disposed in the processor 110, configured to store instructions and data. In some embodiments, the memory in processor 110 is a cache memory. The memory may store an instruction or data that has just been used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

For example, the processor 110 may be configured to execute the automatic exposure method in this embodiment of this application, for example: enabling a camera application in the electronic device; acquiring a first image and first data, where the first image is an image acquired by the first sensor based on an initial exposure parameter, the initial exposure parameter corresponds to a shooting scene in which a shot object of the electronic device is located, and the first data is response values of one or more channels of the second sensor; obtaining a first target lightness of the shooting scene based on the first image; obtaining a target lightness correction amount based on the first data; adjusting the first target lightness based on the target lightness correction amount, to obtain a second target lightness; acquiring a second image, where the second image is an image acquired by the first sensor based on a target exposure parameter, and the target exposure parameter is obtained based on the second target lightness; and displaying or saving the second image.

Connection relationships between modules shown in FIG. 1 are merely schematic descriptions and do not impose a limitation to connection relationships between modules of the electronic device 100. Optionally, a combination of a plurality of connection manners in the foregoing embodiment may be adopted for the modules of the electronic device 100.

A wireless communication function of the electronic device 100 may be implemented through devices such as the antenna 1, the antenna 2, the mobile communication module 150, the wireless communication module 160, the modem processor, and the baseband processor.

The antenna 1 and the antenna 2 are configured to transmit and receive electromagnetic wave signals. Each antenna in the electronic device 100 may be used to cover one or more communication bands. Different antennas may be multiplexed to improve antenna utilization. For example, the antenna 1 may be multiplexed into a diversity antenna of a wireless local area network. In some other embodiments, the antennas may be used with a tuning switch.

The electronic device 100 may implement a display function through the GPU, the display screen 194, and the application processor. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display 194 may be configured to display images or videos.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may perform algorithm optimization on noise, lightness, and a color of the image, and the ISP may further optimize parameters such as exposure and a color temperature of a shooting scene. In some embodiments, the ISP may be disposed in the camera 193.

The camera 193 is configured to capture a static image or a video. An optical image is generated for an object by using the lens and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard image signal in a format such as red green blue (RGB) or YUV. In some embodiments, the electronic device 100 may include 1 or N cameras 193, and N is a positive integer greater than 1.

The digital signal processor is configured to process a digital signal, and in addition a digital image signal, the digital signal processor may also process other digital signals. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG) 1, MPEG 2, MPEG 3, and MPEG 4.

The gyroscope sensor 180B may be configured to determine a motion posture of the electronic device 100. In some embodiments, an angular velocity of the electronic device 100 around three axes (that is, an x axis, a y axis, and a z axis) may be determined through the gyroscope sensor 180B. The gyroscope sensor 180B may be used for image stabilization in photography. For example, when the shutter is pressed, the gyroscope sensor 180B detects a shaking angle of the electronic device 100, and calculates, based on the angle, a distance that needs to be compensated for by the lens module, so that the lens module counteracts shaking of the electronic device 100 through reverse motion, to implement image stabilization. The gyroscope sensor 180B may also be used in scenarios such as navigation and a motion sensing game.

The acceleration sensor 180E may detect acceleration values of the electronic device 100 in all directions (generally, in the x axis, the y axis, and the z axis). When the electronic device 100 is stationary, a magnitude and a direction of a gravity may be detected. The acceleration sensor 180E may be further configured to recognize an attitude of the electronic device 100, where the attitude is used as an input parameter of an application such as switching between landscape orientation and portrait orientation or a pedometer.

The distance sensor 180F is configured to measure a distance. The electronic device 100 may measure a distance by infrared light or laser. In some embodiments, for example, in a shooting scene, the electronic device 100 may measure a distance by using the range sensor 180F, to implement quick focusing.

The ambient light sensor 180L is configured to perceive ambient light brightness. The electronic device 100 can adaptively adjust brightness of the display 194 based on the sensed brightness of the ambient light. The ambient light sensor 180L may also be configured to automatically adjust white balance during photographing. The ambient light sensor 180L may further cooperate with the optical proximity sensor 180G to detect whether the electronic device 100 is in a pocket, so as to prevent an accidental touch.

The fingerprint sensor 180H is configured to collect a fingerprint. The electronic device 100 may implement functions, such as unlocking, application lock accessing, photographing, and call answering, by using characteristics of the acquired fingerprint.

The touch sensor 180K may also be referred to as a touch device. The touch sensor 180K may be arranged on the display screen 194. The touch sensor 180K and the display screen 194 form a touchscreen, which is also referred to as a touch screen. The touch sensor 180K is configured to detect a touch operation on or near the touch sensor 180K. The touch sensor 180K may transfer the detected touch operation to the application processor, to determine a touch event type. Visual output related to the touch operation may be provided by using the display screen 194. In some other embodiments, the touch sensor 180K may be alternatively arranged on a surface of the electronic device 100, and is located at a position different from that of the touchscreen 194.

A hardware system of the electronic device 100 is described in detail above, and a software system of the electronic device 100 is described below.

Figure 2:
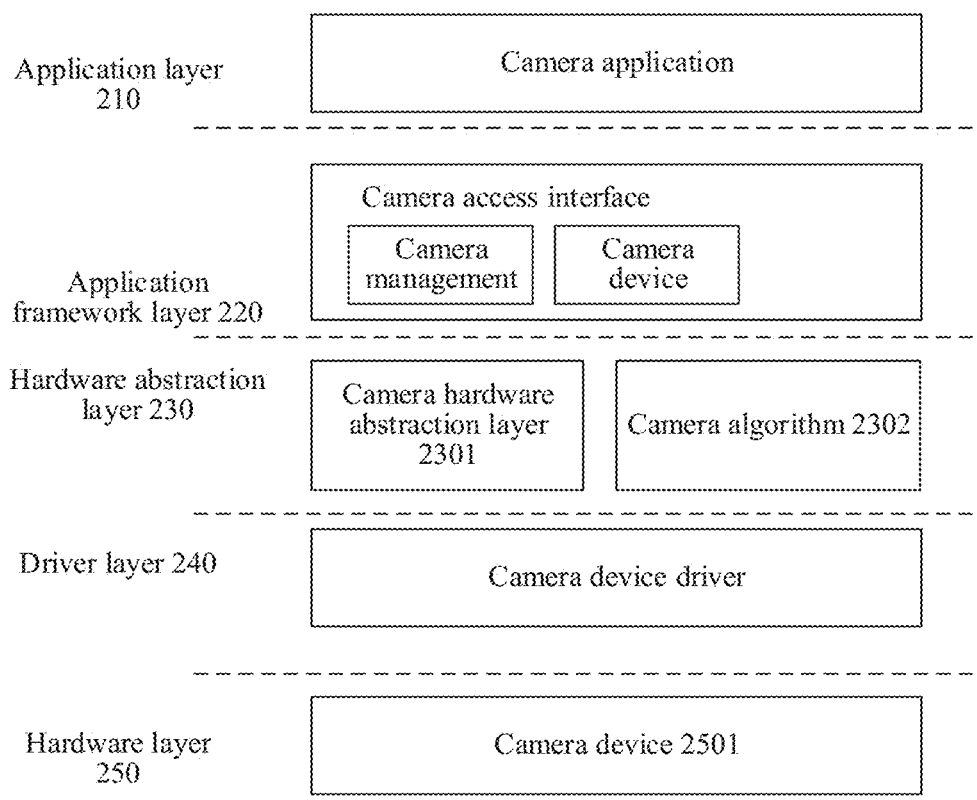
FIG. 2 is a schematic diagram of a software system of an electronic device to which this application is applicable.

FIG. 2 is a schematic diagram of a software system of an electronic device according to an embodiment of this application.

As shown in FIG. 2, a system architecture may include an application layer 210, an application framework layer 220, a hardware abstraction layer 230, a driver layer 240 and a hardware layer 250.

The application layer 210 may include applications such as Camera, Gallery, Calendar, Phone, Map, Navigation, WLAN, Bluetooth, Music, Video, and Messages.

The application framework layer 220 provides an application programming interface (application programming interface, API) and a programming framework for an application at the application layer. The application framework layer may include some predefined functions.

For example, the application framework layer 220 may include a camera access interface; and the camera access interface may include camera management and a camera device. The camera manager may be configured to provide an access interface for camera management. The camera device may be configured to provide an interface for camera access.

The hardware abstraction layer 230 is configured to perform hardware abstraction. For example, the hardware abstraction layer may include a camera abstraction layer and other hardware device abstraction layers; and a camera hardware abstraction layer can invoke a camera algorithm.

For example, the hardware abstraction layer 230 includes the camera hardware abstraction layer 2301 and the camera algorithm 2302; and the camera algorithm 2302 may include a software algorithm for the automatic exposure method provided in the embodiments of this application.

For example, the algorithm in the camera algorithm 2302 may be implemented independently of particular hardware; for example, it is code that can be usually run on a CPU.

The driver layer 240 is configured to provide drivers for different hardware devices. For example, the driver layer may include a camera device driver.

The hardware layer 250 may include a camera device 2501 and other hardware devices.

At present, the image sensor performs light metering according to the target lightness as neutral gray; that is, during the light metering of the camera module, calculation is performed according to the reflectivity of 18-degree gray. However, for some single scenes (for example, a solid-color scene of shooting at a close range), if light metering is performed according to 18-degree gray, the difference between the target lightness of the shooting scene and the actual lightness of the shooting scene is relatively large. That is, the accuracy of the target lightness of the shooting scene obtained by using the existing automatic exposure algorithm is relatively low. For example, during shooting of a black object, the black object in the acquired image will appear gray; and during shooting of a relatively bright white object, the white object in the acquired image will appear gray.

In view of this, an embodiment of this application provides an automatic exposure method, the response value of each channel is acquired in the shooting scene by the multi-spectral sensor in the camera exposure process; the target lightness correction amount can be obtained according to the response value of each channel; and the first target lightness of the shooting scene obtained based on the initial exposure parameter can be adjusted based on the target lightness correction amount, to obtain a second target lightness, which makes the target lightness of the shooting scene acquired by the electronic device is more accurate. When the accuracy of the target lightness of the shooting scene is improved, the accuracy of the target exposure parameter obtained based on the target lightness is also improved. Therefore, the lightness accuracy of the image acquired by the image sensor based on the target exposure parameter is also improved.

With reference to FIG. 3A and FIG. 3B to FIG. 10A and FIG. 10B, the following describes in detail the automatic exposure method provided in the embodiments of this application.

For example, the automatic exposure method in this embodiment of this application may be applied to the field of photographing (for example, monocular photography and binocular photography), the field of video recording (for example, single-view recording and dual-view recording), the field of video calls, or other fields of image processing. By adjusting the exposure parameter of the camera through the automatic exposure method in this embodiment of this application, the lightness accuracy of the image can be improved.

Figure 3A:
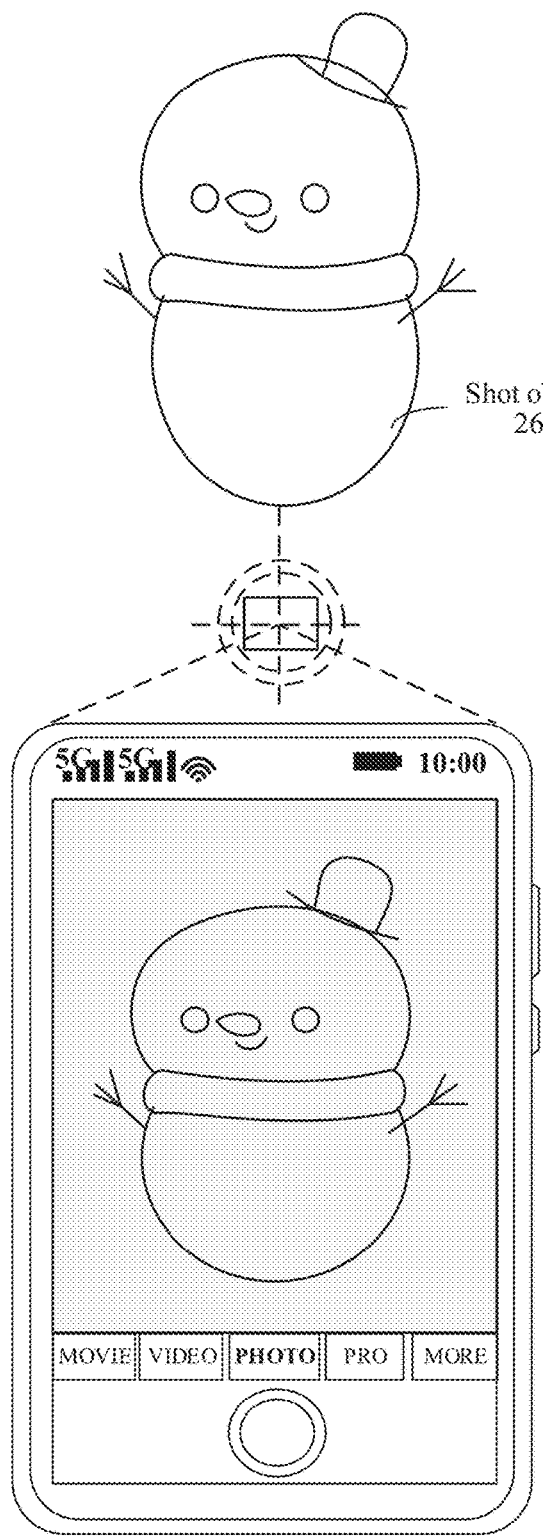
FIG. 3A and FIG. 3B are schematic diagram of an application scenario to which an embodiment of this application is applicable.
Figure 3B:
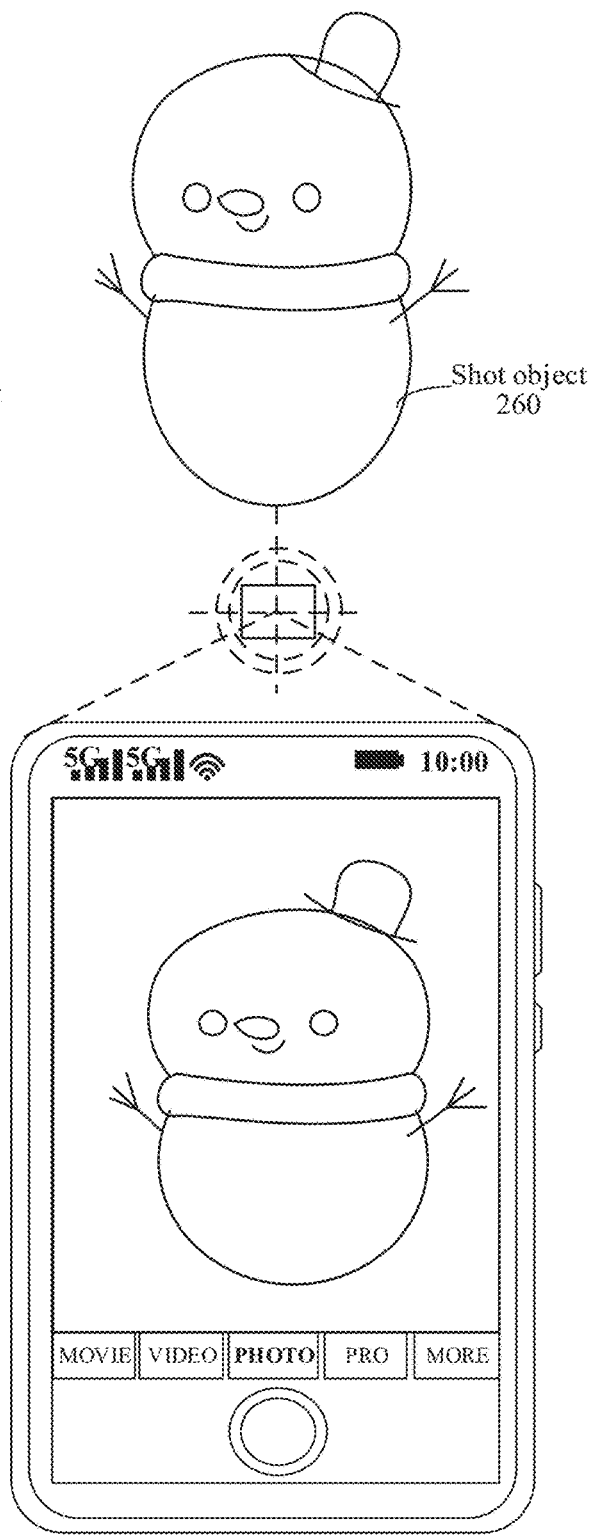

For example, as shown in FIG. 3A and FIG. 3B, during photographing in a snowy scene, the existing automatic exposure method, that is, the method for metering in and out by using intermediate gray levels, results in obvious lightness distortion in the acquired image. The preview image of a shot object 260 (for example, a snowman) obtained by using the existing automatic exposure method is shown in FIG. 3A; the preview image of the shot object 260 obtained by using the automatic exposure method provided in this embodiment of this application is shown in FIG. 3B. Compared with the preview image shown in FIG. 3A, the lightness accuracy of the preview image shown in FIG. 3B is higher. Therefore, through the automatic exposure method in this embodiment of this application, the lightness accuracy of the image can be improved.

Figure 4:
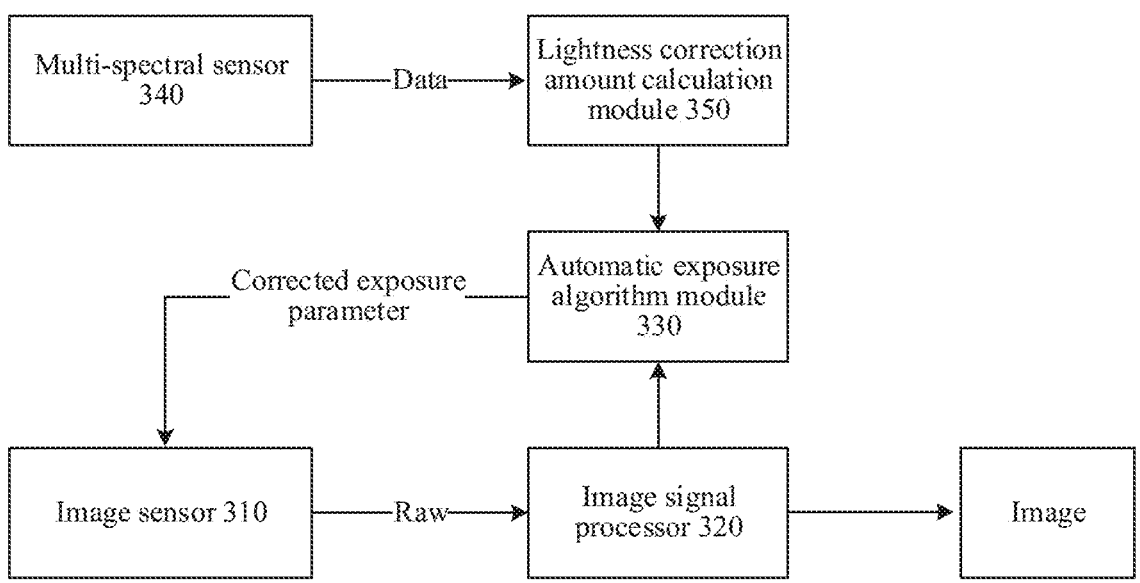
FIG. 4 is a schematic diagram of a system architecture applicable to an automatic exposure method according to this application.

FIG. 4 is a schematic diagram of a system architecture applicable to an automatic exposure method according to this application.

As shown in FIG. 4, a system architecture 300 may include an image sensor 310, an image signal processor 320, an automatic exposure algorithm module 330, a multi-spectral sensor 340, and a lightness correction amount calculation module 350.

The image sensor 310 is configured to acquire a Raw image; and a range of spectra received by the image sensor 310 may be spectra in the visible light band, or may also be spectra including visible light and other wave bands.

It should be understood that, the Raw image may be an image in a Raw color space.

For example, the image signal processor 320 may include an exposure statistics module and an image processing module (for example, an ISP pipeline); the exposure statistics module may be configured for the statistical information of the Raw image, and the statistical information may include a histogram of the Raw image or an average lightness value of regions in the Raw image; the automatic exposure algorithm module 330 may obtain an LV value and a DR value of the shooting scene according to the statistical information of the Raw image; the original target lightness of the shooting scene may be obtained by looking up a table based on the LV value and the DR value; the original exposure parameter of the image sensor may be obtained according to the original target lightness, and the original exposure parameter is sent to the image sensor to control its exposure; and the image processing module is configured to perform image processing on the Raw image acquired by the image sensor 310.

For example, the multi-spectral sensor 340 is configured to acquire data of each channel in the shooting scene, for example, acquire the response value of each channel. The exposure parameter correction amount calculation module 350 is configured to obtain the lightness correction amount according to the response value of the all-pass channel. The automatic exposure algorithm module 330 may adjust the original target lightness of the shooting scene based on the lightness correction amount to obtain a corrected target lightness; and a corrected exposure parameter (for example, an exposure value) may be obtained according to the corrected target lightness. For example, a higher corrected target lightness a greater exposure value of the camera; and a lower corrected target lightness indicates a smaller exposure value of the camera. The image sensor 310 may acquire a Raw image based on the corrected exposure parameter.

It should be understood that, the all-pass channel may refer to all channels covered by the multi-spectral sensor. For example, the spectral bands covered by the multi-spectral sensor may include visible light, infrared light, or near-infrared light.

It should be understood that, the response values of the channels may refer to the response values to the luminous flux of the channels in the shooting scene; or the response values of the channels may refer to the response values of the channels to energy.

In an embodiment of this application, the response value of the all-pass channel can be obtained through the multi-spectral sensor; and for the multi-spectral sensor, because the exposure time is a fixed duration, and the all-pass channel in the multi-spectral sensor covers a relatively wide range of bands. Therefore, based on the all-pass channel, the light of each band in the shooting scene can be accurately acquired, which reflects the real lightness information of the shooting scene. Therefore, the lightness correction amount can be obtained based on the response value of the all-pass channel; and the target lightness of the shooting scene can be adjusted according to the lightness correction amount, so that the target lightness of the shooting scene obtained by the electronic device is more accurate, thereby improving the lightness accuracy of the image acquired by the image sensor.

Figure 5:
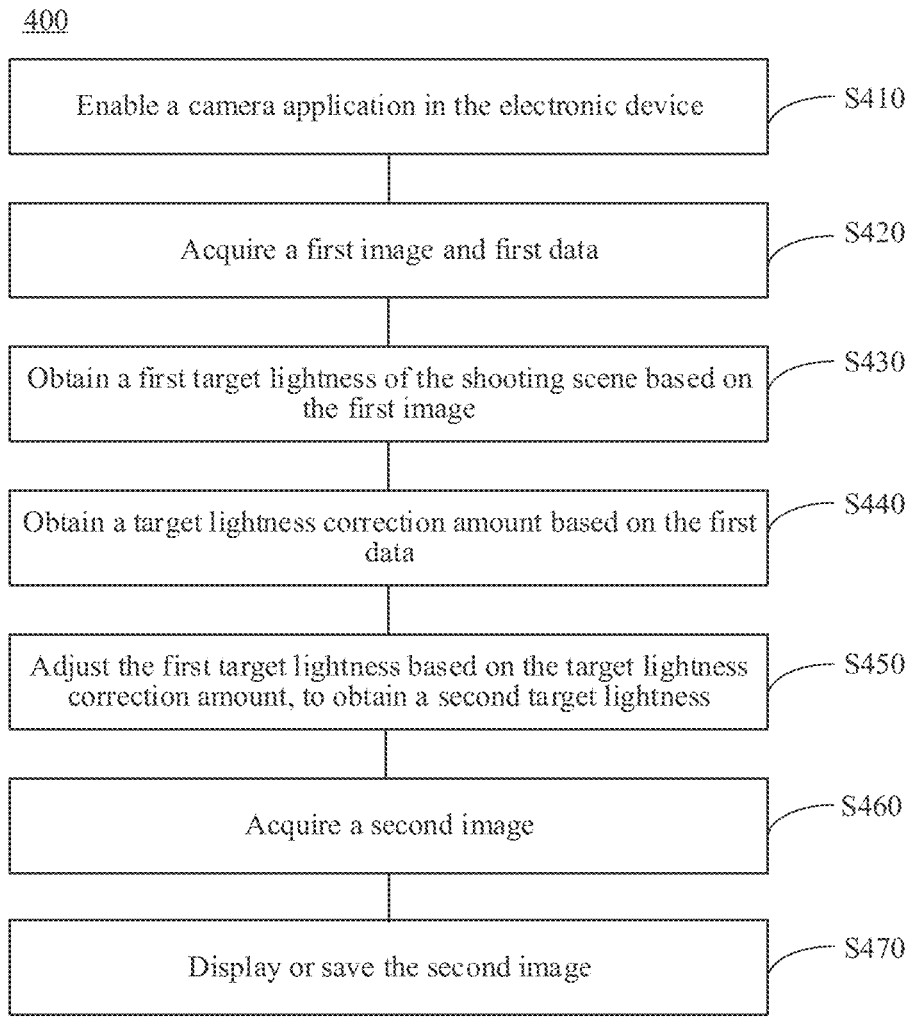
FIG. 5 is a schematic flowchart of an automatic exposure method according to an embodiment of this application.

FIG. 5 is a schematic flowchart of an automatic exposure method according to an embodiment of this application. The automatic exposure method 400 may be performed by the electronic device shown in FIG. 1. The automatic exposure method includes steps S410 to S470. The following describes steps S410 to S470 in detail separately.

It should be understood that, the automatic exposure method shown in FIG. 5 is applicable to an electronic device including a first sensor and a second sensor. For example, the first sensor is an image sensor; and the image sensor may also be referred to as an image sensor. The second sensor is a multi-spectral sensor. The multi-spectral sensor refers to that spectral bands that can be received include several or more than a dozen bands; and the multi-spectral sensor usually receives a wider range of spectral responses than the image sensor.

Step S410: Enable a camera application in the electronic device.

For example, by tapping an icon of the "camera" application in the electronic device, a user can instruct the electronic device to run the camera application. Alternatively, when the electronic device is in a lock screen state, by performing a right-sliding gesture on a display screen of the electronic device, a user can instruct the electronic device to run the camera application. Alternatively, when the electronic device is in a lock screen state, a lock screen interface includes the icon of the camera application, and by tapping the icon of the camera application, a user instructs the electronic device to enable the camera application. Alternatively, when the electronic device is running another application, the application has a right to invoke the camera application; and by tapping a corresponding control, a user can instruct the electronic device to enable the camera application. For example, when the electronic device is running an instant messaging application program, by selecting a control of a camera function, a user can instruct the electronic device to enable the camera application.

Step S420: Acquire a first image and first data.

The first image is an image acquired by the first sensor based on an initial exposure parameter in a shooting scene, and the initial exposure parameter corresponds to the shooting scene in which a shot object of the electronic device is located. For example, the first image is a Raw image acquired by the image sensor; and the first data is the response values of the one or more channels acquired by the multi-spectral sensor in the shooting scene.

It should be understood that, the initial exposure parameter may be an initialized exposure parameter configured based on a preset automatic exposure algorithm, and the exposure parameter may include an exposure time, a light sensitivity, and/or an exposure value. The shooting scene may be related to the light source of the environment in which the electronic device is located during shooting, the scenery in the field of view of the camera of the electronic device, and the shot target object. If any one of the light source, the scenery in the field of view, or the shot target object changes, it can be considered that the shooting scene changes.

It should be further understood that, the response values of the channels may refer to the response values to the luminous flux of the channels in the shooting scene; or the response values of the channels may refer to the response values of the channels to energy.

For example, the first sensor and the second sensor may respectively acquire the first image and the first data simultaneously; or the first sensor and the second sensor may acquire the first image and the first data one after the other. The sequence of acquiring the first image and the first data is not limited in this application.

In an embodiment of this application, because the image sensor performs light metering according to a target lightness as neutral gray, in some cases, an obtained difference between the target lightness of the shooting scene and an actual lightness of the shooting scene is relatively large, resulting in relatively low lightness accuracy of the image acquired by the image sensor. For example, when performing light metering based on neutral gray, the image sensor cannot accurately distinguish the lightness of a brighter region (for example, a white region) and the lightness of a darker region (for example, a black region) in the shooting scene. For the multi-spectral sensor, because the exposure time of the multi-spectral sensor is a fixed duration, and the all-pass channel in the multi-spectral sensor covers a relatively wide range of bands, the light of each band can be accurately acquired. Therefore, the multi-spectral sensor can obtain the lightness of different shot subjects in the shooting scene, that is, it has the characteristic of "black is dark, and white is bright".

Therefore, in this embodiment of this application, the response value of the all-pass channel can be obtained based on the response value of each channel acquired by the multi-spectral sensor in the shooting scene; the lightness correction amount can be obtained based on the response value of the all-pass channel; and the original target lightness (for example, the first target lightness) of the shooting scene can be adjusted according to the lightness correction amount. For example, summation may be performed on the lightness correction amount and the original target lightness to obtain the target lightness of the shooting scene. For example, if the lightness correction amount is a positive value, it may indicate that the original target lightness of the shooting scene is relatively low, and the target lightness is obtained by increasing the lightness on the basis of the original target lightness; and if the lightness correction amount is a negative value, it may indicate that the original target lightness of the shooting scene is relatively high, and the target lightness is obtained by reducing the lightness on the basis of the original target lightness, so that the target lightness of the shooting scene acquired by the electronic device is more accurate. When the accuracy of the target lightness of the shooting scene is improved, the accuracy of the target exposure parameter obtained based on the target lightness is also improved. Therefore, the lightness accuracy of the image acquired by the image sensor based on the target exposure parameter is also improved.

Step S430: Obtain a first target lightness of the shooting scene based on the first image.

For example, based on the statistical information of the first image, the first target lightness of the shooting scene may be obtained, where the statistical information may include: a histogram of the first image, an average lightness value of regions in the first image, or the like.

Further, the LV value and the DR value can be calculated according to the statistical information of the first image; the first target lightness of the shooting scene can be obtained by looking up the table based on the LV value and the DR value, where the table may refer to a mapping table between the pre-obtained LV value and DR value and the target lightness.

For example, as shown in FIG. 4, the automatic exposure algorithm module 330 can acquire statistical information of the image; based on the statistical information, the LV value and the DR value can be calculated; and based on the LV value and the DR value, the first target lightness of the shooting scene can be obtained.

It should be understood that, the first target lightness is used for representing the original target lightness of a shooting scene obtained based on a preset automatic exposure algorithm; and corresponding to different shooting scenes, the original target lightness may be different.

Step S440: Obtain a target lightness correction amount based on the first data.

For example, the first data acquired by the multi-spectral sensor includes the response value of the first channel, so that the response value of the first channel can be directly obtained; and the target lightness correction amount can be obtained according to a response value of a first channel and a mapping relationship, where the first channel refers to an all-pass channel corresponding to the shooting scene, and the mapping relationship is used for representing an association between a lightness correction amount and a response value of the all-pass channel.

Figure 7:
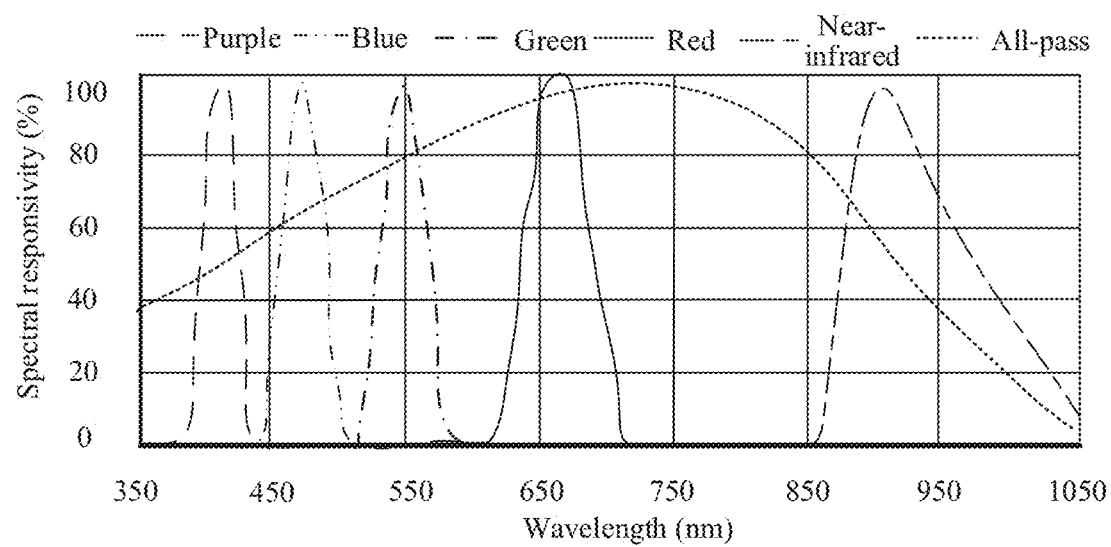
FIG. 7 shows spectral response curves of a multi-spectral sensor according to an embodiment of this application.

It should be understood that, the all-pass channel may refer to a channel that can reflect light in various wavelength bands; and the all-pass channel may include visible light, infrared light, near-infrared light, and the like. For example, as shown in FIG. 7, the all-pass channel can represent an optical channel corresponding to the band from 350 nm to 1050 nm. The spectral response curves shown in FIG. 7 may include response curves corresponding to a purple band, a blue band, a green band, a red band, a near-infrared band, and an all-pass band respectively. Because the all-pass channel responds to the spectrum of each band, the lightness of the image acquired for the black region in the shooting scene is relatively low; and the lightness of the image acquired for the white region in the shooting scene is relatively high. Therefore, there is a characteristic of "black is dark", and white is bright", and the response of each band can be accurately obtained through the all-pass channel.

For example, in a case that the data acquired by the multi-spectral sensor includes the response value of the all-pass channel, the mapping relationship may be directly searched based on the response value of the all-pass channel to obtain the lightness correction amount. For example, the lightness correction amount may refer to increasing a partial exposure value "+X EV", or decreasing a partial exposure value "−X EV".

For example, if the first data acquired by the multi-spectral sensor does not include the response value of the first channel, the response values of the channels may be added to obtain the response value of the first channel.

For example, in a case that the first data acquired by the multi-spectral sensor does not include the response value of the all-pass channel, the response values of the channels may be added to obtain the response value of the all-pass channel. Based on the response value of the all-pass channel, the mapping relationship is searched to obtain the target lightness correction amount.

For example, summation may be performed on the response values of the channels directly to obtain the response value of the all-pass channel.

Figure 8:
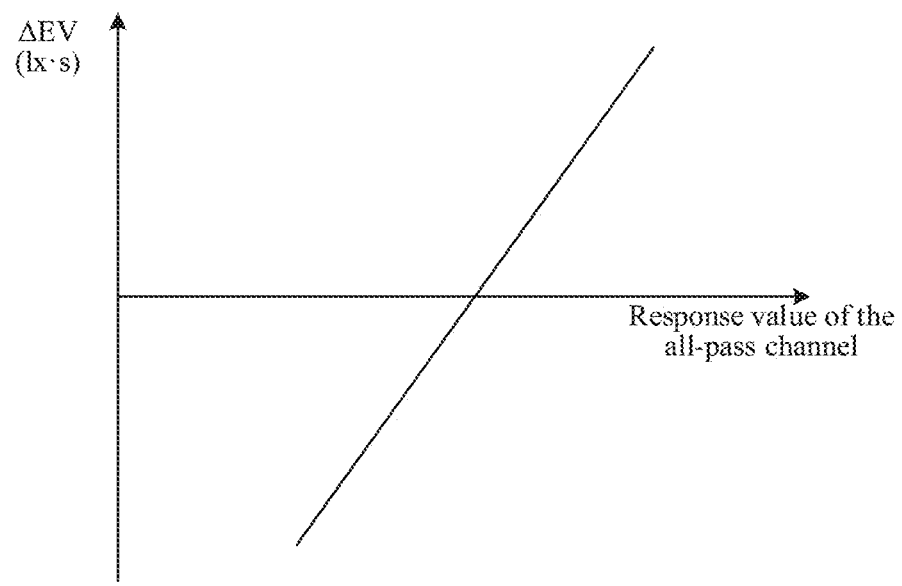
FIG. 8 is a schematic diagram of an association between a lightness correction amount and a response value of an all-pass channel according to an embodiment of this application.

For example, the mapping relationship may refer to a functional relationship between the lightness correction amount and the response value of the all-pass channel. For example, the mapping relationship may refer to that there may be a monotonic function between the exposure correction amount ($\Delta EV$) and the response value of the all-pass channel, as shown in FIG. 8.

For example, the mapping relationship may alternatively refer to a mapping list between the lightness correction amount and the response value of the all-pass channel.

It should be understood that, the mapping relationship is illustrated above by using an example of a functional relationship and a mapping list, and the mapping relationship may also be expressed in other forms, which is not limited in this application.

Step S450: Adjust the first target lightness based on the target lightness correction amount, to obtain a second target lightness.

For example, the target lightness correction amount may refer to an exposure correction amount, and the exposure value may be increased or decreased according to the exposure correction amount, to obtain the second target lightness.

It should be understood that, the first target lightness refers to the target lightness of the shooting scene obtained based on an initial parameter configured in a preset automatic exposure algorithm; and the second target lightness refers to the target lightness of the shooting scene obtained after the first target lightness is adjusted based on the target lightness correction amount.

Optionally, before the first target lightness is adjusted based on the target lightness correction amount, that the shooting scene remains unchanged may be determined.

It should be understood that, the shooting scene may be related to the light source of the environment in which the electronic device is located during shooting, the scenery in the field of view of the camera of the electronic device, and the shot target object. If any one of the light source, the scenery in the field of view, or the shot target object changes, it can be considered that the shooting scene changes.

It should be understood that, because for the same shooting scene, the image sensor cannot accurately distinguish the lighting value of a brighter region (for example, a white region) and the lighting value of a darker region (for example, a black region) in the shooting scene, the lighting value accuracy of the image acquired is relatively low. That is, when the shooting scene has not changed, the first target lightness of the shooting scene needs to be adjusted to obtain the second target lightness with higher lightness accuracy; and if the shooting scene has changed, the automatic exposure algorithm will recalculate the target lightness of the shooting scene. In an embodiment of this application, whether the current shooting scene has changed can be determined based on the data of each channel acquired by the multi-spectral sensor.

For example, whether the shooting scene has changed may be determined based on the color temperature difference value. If the shooting scene has changed, the color temperature change is relatively large, that is, the color temperature difference value is relatively large; and if the shooting scene has not changed, the color temperature change is relatively small, that is, the color temperature difference value is relatively small.

For example, the first data acquired by the multi-spectral sensor may represent the $N^{th}$ frame of data, and an average color temperature corresponding to N frames of data and a color temperature corresponding to the $N^{th}$ frame of data may be acquired. A color temperature difference value is obtained based on the average color temperature corresponding to the N frames of data and the color temperature corresponding to the $N^{th}$ frame of data, where the color temperature difference value refers to a difference value between the average color temperature corresponding to the N frames of data and the color temperature corresponding to the $N^{th}$ frame of data; and in a case that the color temperature difference value is less than or equal to a preset threshold, it is determined that the shooting scene remains unchanged.

It should be understood that, in an embodiment of this application, each "color temperature" refers to the correlated color temperature. For example, the color temperature corresponding to the $N^{th}$ frame of data refers to the correlated color temperature corresponding to the $N^{th}$ frame of data; and the average color temperature may refer to the average value of the correlated color temperature, where the correlated color temperature for some non-black body light sources may be described by the color temperature of their most visually similar black body; this is referred to as their correlated color temperature; the symbol for the correlated color temperature is Tcp; and the unit of the correlated color temperature is K. It should be understood that, one frame of data acquired by the multi-spectral sensor may correspond to one frame of image acquired by the image sensor. For example, if the image sensor acquires the first frame of data, the multi-spectral sensor can collect one frame of data in the shooting scene. It is assumed that the first data acquired by the multi-spectral sensor includes the response values of 10 channels, then one frame of data may refer to a one-dimensional vector of 1×10, which is used for representing the response values of 10 channels, and one value corresponds to the response value of one channel.

For example, $K_N=(K_{N-1}+T_N)/2$, where $K_N$ represents the average color temperature corresponding to N frames of data, $K_{N-1}$ represents the average color temperature corresponding to N−1 frames of data, and $T_N$ represents the color temperature corresponding to the $N^{th}$ frame of data.

For example, the color temperature corresponding to the $N^{th}$ frame of data may be obtained based on the $N^{th}$ frame of data and calibration color temperature data, where the calibration color temperature data refers to response values of different channels corresponding to color temperature ranges obtained through calibration.

For example, for the multi-spectral sensor, the color temperature may be outputted by calibration and matching. For example, the response values of bands corresponding to different color temperatures may be calibrated; it is assumed that the color temperature 500K to 6500K is divided into 10 groups of color temperatures on average, each group of color temperatures may correspond to the response values of a group of bands, and 10 vectors are obtained; and one frame of data actually acquired by the multi-spectral sensor, that is, the response values of the channels that are acquired, may be fitted with the 10 groups of color temperature calibration values, to obtain the color temperature corresponding to the one frame of data actually acquired.

For example, when N=2, the color temperature corresponding to the first frame of data and the color temperature corresponding to the second frame of data can be obtained through calibration and matching, that is, $K_2=(K_1+T_2)/2$, where $K_2$ represents the corresponding average color temperature corresponding to the two frames of data, $K_1$ represents the average color temperature corresponding to one frame of data, that is, the color temperature corresponding to the first frame of data, and $T_2$ represents the color temperature of the second frame of data. In other words, the average color temperature of the first two frames of data may refer to an average value of the color temperature corresponding to the first frame of data and the color temperature corresponding to the second frame of data.

Optionally, when detecting that the camera application is enabled, the electronic device may trigger the multi-spectral sensor to start acquiring the first frame of data in the N frames of data. For the specific operation of enabling the camera application, reference may be made to the relevant description of step S410, and details are not described herein again. Alternatively, when detecting a video recording indication, the electronic device may trigger the multi-spectral sensor to start acquiring the first frame of data in the N frames of data.

For example, the first target lightness is adjusted based on the target lightness correction amount. For example, summation may be performed on the lightness correction amount and the first target lightness (for example, the original target lightness) to obtain the target lightness (for example, the second target lightness) of the shooting scene. For example, if the lightness correction amount is a positive value, it may indicate that the first target lightness of the shooting scene is relatively low, and the second target lightness is obtained by increasing the lightness on the basis of the first target lightness; and if the lightness correction amount is a negative value, it may indicate that the first target lightness of the shooting scene is relatively high, and the second target lightness is obtained by reducing the lightness on the basis of the first target lightness, thereby realizing a "white plus black minus" policy. For example, for an overall brighter (for example, white) region in the shooting scene, the exposure value can be increased to make a white object show the correct lightness; and for an overall darker (black) region in the shooting scene, the exposure value can be reduced to make a black object show the correct lightness.

Step S460: Acquire a second image.

The second image is an image acquired by the first sensor based on a target exposure parameter, and the target exposure parameter is obtained based on the second target lightness.

For example, the target exposure parameter of the image sensor can be obtained based on the second target lightness; the image sensor can acquire a Raw image, that is, a second image, in the shooting scene based on the target exposure parameter, where the target exposure parameter includes an exposure time, a light sensitivity, and/or an exposure value. For example, a higher second target lightness indicates a greater exposure value of the camera; and a lower second target lightness indicates a smaller exposure value of the camera. Optionally, the correspondence, the mapping relationship, and the functional relationship between the target lightness and the exposure parameter are pre-configured or can be obtained by looking up a table; the size of the exposure parameter may be adjusted according to a positive value or negative value of the target lightness correction amount; and the exposure parameter may alternatively be quantitatively or non-quantitatively adjusted according to an increase or a decrease of the target lightness.

For example, image quality of the second image is higher than image quality of the first image.

It should be understood that, that image quality of the second image is higher than image quality of the first image may mean that the second image has a higher lightness restoration of the shooting scene; or that image quality of the second image is higher than image quality of the first image means that the lightness accuracy of the second image is higher, or the second image and the first image are evaluated by using an image lightness evaluation algorithm, and the obtained evaluation result is that the image quality of the second image is higher than the image quality of the first image, or the like. This is not limited in this application.

Step S470: Display or save the second image.

For example, if the camera application is in a preview state, the second image can be displayed.

For example, if the camera application is in a photographing state or a video recording state, the second image can be saved.

In an embodiment of this application, the response value of each channel can be acquired in the shooting scene by the multi-spectral sensor; the target lightness correction amount can be obtained according to the response value of the all-pass channel; and the first target lightness of the shooting scene obtained based on the initial exposure parameter can be adjusted based on the target lightness correction amount, to obtain a second target lightness, which makes the target lightness of the shooting scene acquired by the electronic device is more accurate. When the accuracy of the target lightness of the shooting scene is improved, the accuracy of the target exposure parameter obtained based on the target lightness is also improved. Therefore, the lightness accuracy of the image acquired by the image sensor based on the target exposure parameter is also improved.

Figure 6:
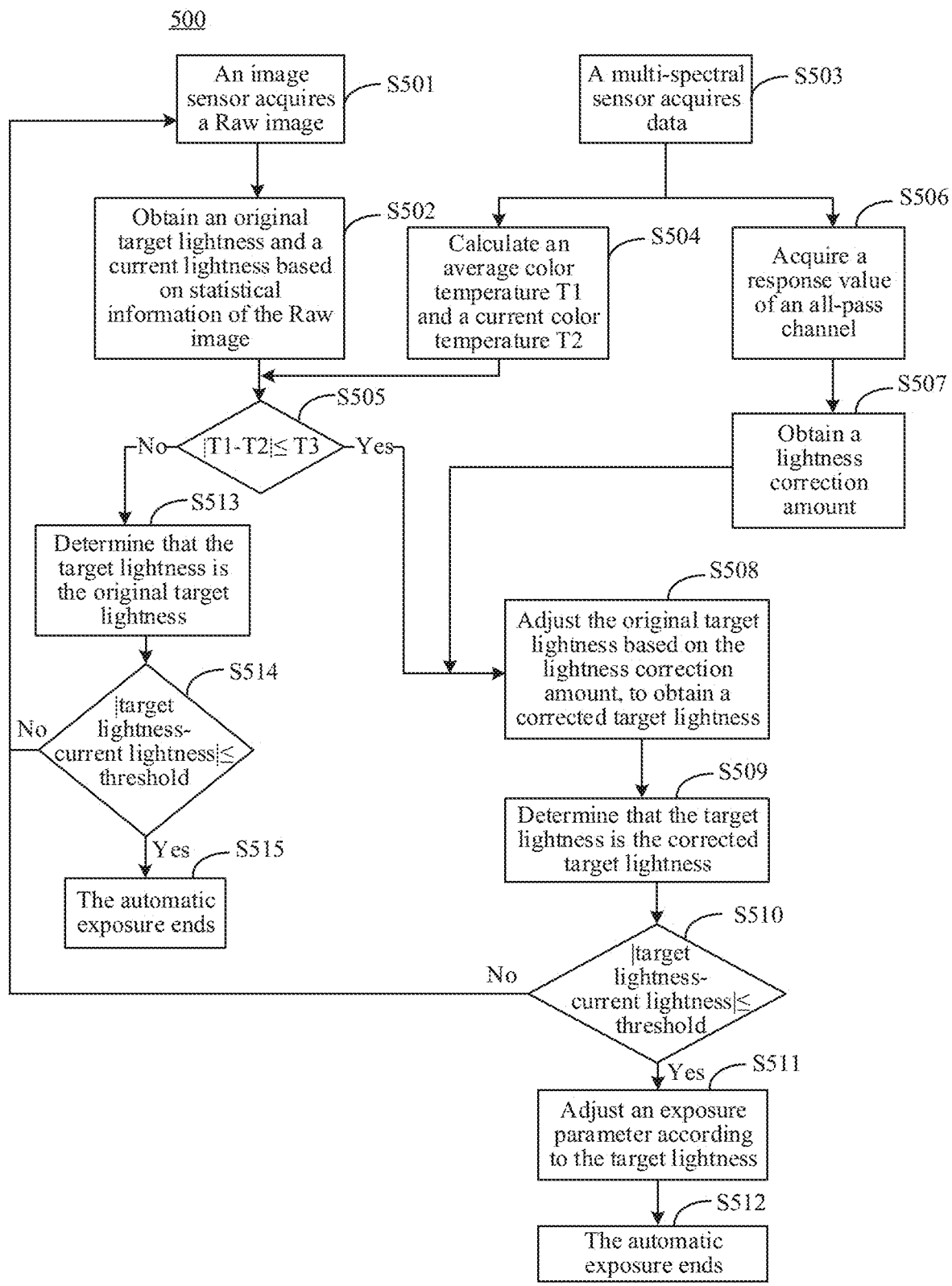
FIG. 6 is a schematic flowchart of an automatic exposure method according to an embodiment of this application.

FIG. 6 is a schematic flowchart of an automatic exposure method according to an embodiment of this application. The automatic exposure method 500 may be performed by the electronic device shown in FIG. 1. The automatic exposure method includes steps S501 to S515. The following describes steps S501 to S515 in detail separately.

Step S501: An image sensor acquires a Raw image (which is an example of a first image).

For example, the image sensor can obtain an initial exposure parameter according to a preset automatic exposure algorithm; and a Raw image is obtained by the image sensor based on the initial exposure parameter.

It should be understood that, the preset automatic exposure algorithm may refer to any existing automatic exposure algorithm, which is not limited in this application.

Step S502: Obtain an original target lightness (which is an example of the first target lightness) and a current lightness based on statistical information of the Raw image.

It should be understood that, the original target lightness may be used for representing the lightness of the light source in the environment of the shooting scene in which the electronic device is located; and the current lightness may be used for representing the lightness corresponding to one frame of Raw image.

It should be further understood that, the original target lightness herein is used for representing the target lighting value of a shooting scene obtained based on a preset automatic exposure algorithm; and corresponding to different shooting scenes, the original target lightness may be different.

For example, the LV value and the DR value can be calculated based on the statistical information of the Raw image; and the original target lightness of the shooting scene can be obtained by looking up the table based on the LV value and the DR value, where the table may refer to a mapping table between the pre-obtained LV value and DR value and the target lightness.

For example, a current lightness may be obtained based on statistical information of the Raw image.

For example, the statistical information may include: a histogram of the Raw image, or an average lightness value of regions of the Raw image.

Step S503: A multi-spectral sensor acquires data (which is an example of first data).

For example, the data acquired by the multi-spectral sensor may refer to the response values of the channels acquired in the shooting scene; and the response values of the channels may be used for representing the lighting values of the channels.

It should be understood that, the response values of the channels may refer to the response values to the luminous flux of the channels in the shooting scene; or the response values of the channels may refer to the response values of the channels to energy.

Optionally, the foregoing step S501 and step S503 may be performed synchronously; or step S501 and step S503 may be separately performed one after the other. The sequence of execution of step S501 and step S503 is not limited in this application.

Step S504: Calculate an average color temperature T1 and a current color temperature $T_2$.

For example, the average color temperature T1 and the current color temperature T2 are calculated according to the data acquired by the multi-spectral sensor.

It should be understood that, because for the same shooting scene, the image sensor cannot accurately distinguish the lighting value of a brighter region (for example, a white region) and the lighting value of a darker region (for example, a black region) in the shooting scene, the lighting value accuracy of the image acquired is relatively low. That is, when the shooting scene has not changed, the original target lightness of the shooting scene needs to be adjusted to obtain the target lightness with higher lightness accuracy; and if the shooting scene has changed, the automatic exposure algorithm will recalculate the original target lightness of the shooting scene. In an embodiment of this application, whether the current shooting scene has changed can be determined based on the data of each channel acquired by the multi-spectral sensor.

For example, the data acquired by the multi-spectral sensor may represent the $N^{th}$ frame of data, and the average color temperature corresponding to the N frames of data and the color temperature corresponding to the $N^{th}$ frame of data may be obtained; A color temperature difference value is obtained based on the average color temperature corresponding to the N frames of data and the color temperature corresponding to the $N^{th}$ frame of data, where the color temperature difference value refers to a difference value between the average color temperature corresponding to the N frames of data and the color temperature corresponding to the $N^{th}$ frame of data; and when the color temperature difference value is less than or equal to a preset threshold, it is determined that the shooting scene remains unchanged.

It should be understood that, in an embodiment of this application, each "color temperature" refers to the correlated color temperature. For example, the average color temperature may refer to the average value of the correlated color temperature; and the current color temperature may refer to the correlated color temperature, where the correlated color temperature for some non-black body light sources may be described by the color temperature of their most visually similar black body; this is referred to as their correlated color temperature; the symbol for the correlated color temperature is Tcp; and the unit of the correlated color temperature is K.

For example, for the multi-spectral sensor, the color temperature may be outputted by calibration and matching. For example, the response values of bands corresponding to different color temperatures may be calibrated; it is assumed that the color temperature 500K to 6500K is divided into 10 groups of color temperatures on average, each group of color temperatures may correspond to the response values of a group of bands, and 10 vectors are obtained; and one frame of data actually acquired by the multi-spectral sensor, that is, the response values of the channels that are acquired, may be fitted with the 10 groups of color temperature calibration values, to obtain the color temperature corresponding to the one frame of data actually acquired.

For example, $K_N=(K_{N-1}+T_N)/2$, where $K_N$ represents the average color temperature corresponding to N frames of data, $K_{N-1}$ represents the average color temperature corresponding to N−1 frames of data, and $T_N$ represents the color temperature corresponding to the $N^{th}$ frame of data.

For example, when N=2, the color temperature corresponding to the first frame of data and the color temperature corresponding to the second frame of data can be obtained through calibration and matching, that is, $K_2=(K_1+T_2)/2$, where $K_2$ represents the corresponding average color temperature corresponding to the two frames of data, $K_1$ represents the average color temperature corresponding to one frame of data, that is, the color temperature corresponding to the first frame of data, and $T_2$ represents the color temperature of the second frame of data. In other words, the average color temperature of the first two frames of data may refer to an average value of the color temperature corresponding to the first frame of data and the color temperature corresponding to the second frame of data.

Optionally, step S504 is applicable to the relevant description about color temperature in step S450 shown in FIG. 5, and the steps are not repeated herein.

Step S505: Determine whether |T1−T2|≤T3; if yes, perform step S506 to step S512; and if not, perform step S513 to step S515.

For example, whether the color temperature difference value between the average color temperature T1 and the current color temperature $T_2$ is less than or equal to the preset threshold T3 is determined, that is, whether |T1−T2|≤T3 is determined.

In an embodiment of this application, the color temperature difference value is introduced to determine whether the shooting scene has changed. Because for the same shooting scene, the image sensor cannot accurately distinguish the lighting value of a brighter region (for example, a white region) and the lighting value of a darker region (for example, a black region) in the shooting scene, the lighting value accuracy of the image acquired is relatively low. Therefore, the color temperature is estimated based on the data of each channel acquired by the multi-spectral sensor, that is, the color temperature difference value between the average color temperature T1 and the current color temperature T2 is calculated, and whether the current shooting scene has changed may be determined based on the color temperature difference value. When the shooting scene has not changed, the lightness correction amount can be obtained based on the data acquired by the multi-spectral sensor; and based on the lightness correction amount, the original target lightness of the shooting scene can be adjusted to obtain the corrected target lightness. For example, summation may be performed on the lightness correction amount and the original target lightness to obtain the corrected target lightness. For example, if the lightness correction amount is a positive value, it may indicate that the original target lightness of the shooting scene is relatively low, and the corrected target lightness is obtained by increasing the lightness on the basis of the original target lightness; and if the lightness correction amount is a negative value, it may indicate that the original target lightness of the shooting scene is relatively high, and the corrected target lightness is obtained by reducing the lightness on the basis of the original target lightness. Based on the corrected target lightness, an exposure parameter (for example, exposure value) of the image sensor may be adjusted, so as to improve lightness accuracy of an image acquired by the image sensor.

It should be understood that, the shooting scene may be related to the light source of the environment in which the electronic device is located during shooting, the scenery in the field of view of the camera of the electronic device, and the shot target object. If any one of the light source, the scenery in the field of view, or the shot target object changes, it can be considered that the shooting scene changes.

Step S506: Acquire a response value of an all-pass channel (which is an example of a first channel).

It should be understood that, the all-pass channel may refer to a channel that can reflect light in various wavelength bands; and the all-pass channel may include visible light, infrared light, near-infrared light, and the like. For example, as shown in FIG. 7, the all-pass channel can represent an optical channel corresponding to the band from 350 nm to 1050 nm. The spectral response curves shown in FIG. 7 may include response curves corresponding to a purple band, a blue band, a green band, a red band, a near-infrared band, and an all-pass band respectively. Because the all-pass channel responds to the spectrum of each band, the lightness of the image acquired for the black region in the shooting scene is relatively low; and the lightness of the image acquired for the white region in the shooting scene is relatively high. Therefore, there is a characteristic of "black is dark", and white is bright", and the response of each band can be accurately obtained through the all-pass channel.

For example, the data of each channel acquired by the multi-spectral sensor includes the response value of the all-pass channel, and then the response value of the all-pass channel can be obtained directly.

For example, if the data of the channels acquired by the multi-spectral sensor does not include the response value of the all-pass channel, the response values of the channels may be added to obtain the response value of the all-pass channel.

Optionally, step S506 may be performed after step S505; or step S506 may be performed simultaneously with step S504.

Step S507: Obtain a lightness correction amount.

For example, the lightness correction amount (an example of the target lightness correction amount) is obtained based on the response value of the all-pass channel.

Optionally, the lightness correction amount can be obtained according to the response value of the all-pass channel and the mapping relationship. For example, the lightness correction amount corresponding to the response value can be found in the mapping relationship based on the response value of the all-pass channel, where the mapping relationship may refer to an association between the lightness correction amount obtained through calibration and the response value of the all-pass channel.

For example, the mapping relationship may refer to a functional relationship between the exposure correction amount and the response value of the all-pass channel. For example, the mapping relationship may refer to that there may be a monotonic function between the exposure correction amount (ΔEV) and the response value of the all-pass channel, as shown in FIG. 8.

For example, in a case that the data acquired by the multi-spectral sensor includes the response value of the all-pass channel, the mapping relationship may be directly searched based on the response value of the all-pass channel to obtain the lightness correction amount. For example, the lightness correction amount may refer to increasing a partial exposure value "+X EV", or decreasing a partial exposure value "−X EV".

For example, in a case that the data acquired by the multi-spectral sensor includes the response value of the all-pass channel, the response values of the channels may be added to obtain the response value of the all-pass channel; and the mapping relationship may be searched based on the response value of the all-pass channel to obtain the lightness correction amount. For example, the lightness correction amount may refer to increasing a partial exposure value "+X EV", or decreasing a partial exposure value "−X EV".

For example, the mapping relationship may alternatively refer to a mapping list between the lightness correction amount and the response value of the all-pass channel.

It should be understood that, the mapping relationship is illustrated above by using an example of a functional relationship and a mapping list, and the mapping relationship may also be expressed in other forms, which is not limited in this application.

Step S508: Adjust the original target lightness based on the lightness correction amount, to obtain a corrected target lightness (for example, an example of a second target lightness).

It should be understood that, when the color temperature difference value between the average color temperature T1 and the current color temperature T2 is less than or equal to the preset threshold T3, it means that the shooting scene of the electronic device has not changed. In this case, there is a difference between the original target lightness of the shooting scene acquired by the image sensor and the actual lightness of the shooting scene, so that the original target lightness obtained in step S502 needs to be adjusted to obtain the corrected target lightness.

For example, the lightness correction amount can be obtained according to the response value of the all-pass channel obtained by the multi-spectral sensor; and the original target lightness can be adjusted based on the lightness correction amount to obtain the corrected target lightness, where for the specific process of acquiring the lightness correction amount, reference may be made to step S507, and details are not described herein again.

Step S509: Determine that the target lightness is the corrected target lightness (for example, an example of the second target lightness).

Step S510: Determine whether |target lightness-current lightness|≤threshold; if yes, perform step S511; and if not, return to perform step S501.

For example, whether a difference value between the target lightness and the current lightness is less than or equal to the threshold is determined.

Step S511: Adjust an exposure parameter according to the target lightness.

For example, the exposure parameter may include an exposure time, a light sensitivity, and/or an exposure value.

For example, a higher target lightness indicates a greater exposure value of the camera; and a lower target lightness indicates a smaller exposure value of the camera.

For example, as shown in FIG. 4, the exposure parameter correction amount calculation module 320 can obtain the lightness correction amount according to the data of each channel acquired by the multi-spectral sensor; the automatic exposure algorithm module 330 can adjust the original target lightness according to the lightness correction amount to obtain the corrected target lightness; a corrected exposure parameter can be obtained based on the corrected target lightness; and the image sensor 310 can acquire a Raw image according to the corrected exposure parameter.

Optionally, after the corrected exposure parameter is obtained based on the corrected target lightness, the corrected exposure parameter may be sent to the image sensor, and the image sensor acquires a Raw image (an example of the second image) based on the corrected exposure parameter. That the image sensor acquires the Raw image based on the corrected exposure parameter can improve the lightness accuracy of the Raw image.

Step S512: The automatic exposure ends.

Step S513: Determine that the target lightness is the original target lightness.

For example, in a case of |T1−T2>T3, it is determined that the target lightness is the original target lightness.

Optionally, when the target lightness is the original target lightness, there is no need to adjust the exposure parameter.

It should be understood that, when the color temperature difference value between the average color temperature T1 and the current color temperature T2 is greater than the preset threshold T3, it indicates that the shooting scene of the electronic device has changed. For example, the shooting scene of the electronic device may be changed from an indoor shooting scene to an outdoor shooting scene; when the shooting scene of the electronic device has changed, a preset automatic exposure algorithm may be used to obtain the original target lightness corresponding to the shooting scene; and the exposure parameter of the image sensor may be adjusted based on the original target lightness, where the preset automatic exposure algorithm may be any existing automatic exposure algorithm.

For example, as shown in FIG. 4, the image signal processor 320 may include an exposure statistics module and an image processing module (for example, an ISP pipeline); the exposure statistics module may be configured for the statistical information of the Raw image, and the statistical information may include a histogram of the Raw image or an average lightness value of regions in the Raw image; the automatic exposure algorithm module 330 may obtain an LV value and a DR value of the shooting scene according to the statistical information of the Raw image; and the original target lightness of the shooting scene may be obtained by looking up a table based on the LV value and the DR value.

Step S514: Determine whether |target lightness-current brightness|≤threshold; if yes, perform step S515; and if not, return to perform step S501.

For example, whether a difference value between the target lightness and the current lightness is less than or equal to the threshold is determined.

Step S515: The automatic exposure ends.

In an embodiment of this application, because the image sensor performs light metering according to a target lightness as neutral gray, in some cases, an obtained difference between the target lightness of the shooting scene and an actual lightness of the shooting scene is relatively large, resulting in relatively low lightness accuracy of the image acquired by the image sensor. For example, when performing light metering based on neutral gray, the image sensor cannot accurately distinguish the lightness of a brighter region (for example, a white region) and the lightness of a darker region (for example, a black region) in the shooting scene. For the multi-spectral sensor, because the exposure time of the multi-spectral sensor is a fixed duration, and the all-pass channel in the multi-spectral sensor covers a relatively wide range of bands, the light of each band can be accurately acquired. Therefore, the multi-spectral sensor can obtain the lightness of different shot subjects in the shooting scene, that is, it has the characteristic of "black is dark, and white is bright". Therefore, in this embodiment of this application, the response value of the all-pass channel can be obtained based on the response value of each channel acquired by the multi-spectral sensor in the shooting scene; the lightness correction amount can be obtained based on the response value of the all-pass channel; and the target lightness of the shooting scene can be corrected according to the lightness correction amount. For example, summation may be performed on the lightness correction amount and the original target lightness to obtain the target lightness of the shooting scene. For example, if the lightness correction amount is a positive value, it may indicate that the original target lightness of the shooting scene is relatively low, and the target lightness is obtained by increasing the lightness on the basis of the original target lightness; and if the lightness correction amount is a negative value, it may indicate that the original target lightness of the shooting scene is relatively high, and the target lightness is obtained by reducing the lightness on the basis of the original target lightness, so that the target lightness of the shooting scene acquired by the electronic device is more accurate. When the accuracy of the target lightness of the shooting scene is improved, the accuracy of the target exposure parameter obtained based on the target lightness is also improved. Therefore, the lightness accuracy of the image acquired by the image sensor based on the target exposure parameter is also improved.

Figure 9A:
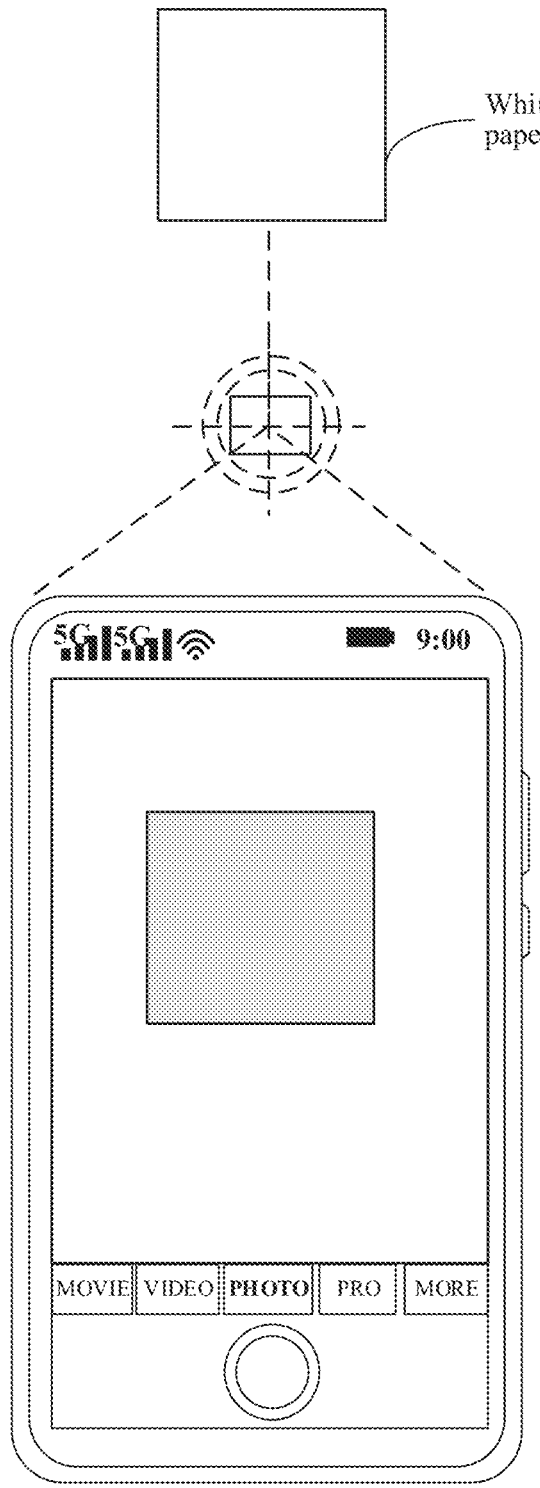
FIG. 9A and FIG. 9B are schematic diagrams of an effect of an automatic exposure method based on this application according to an embodiment of this application.
Figure 9B:
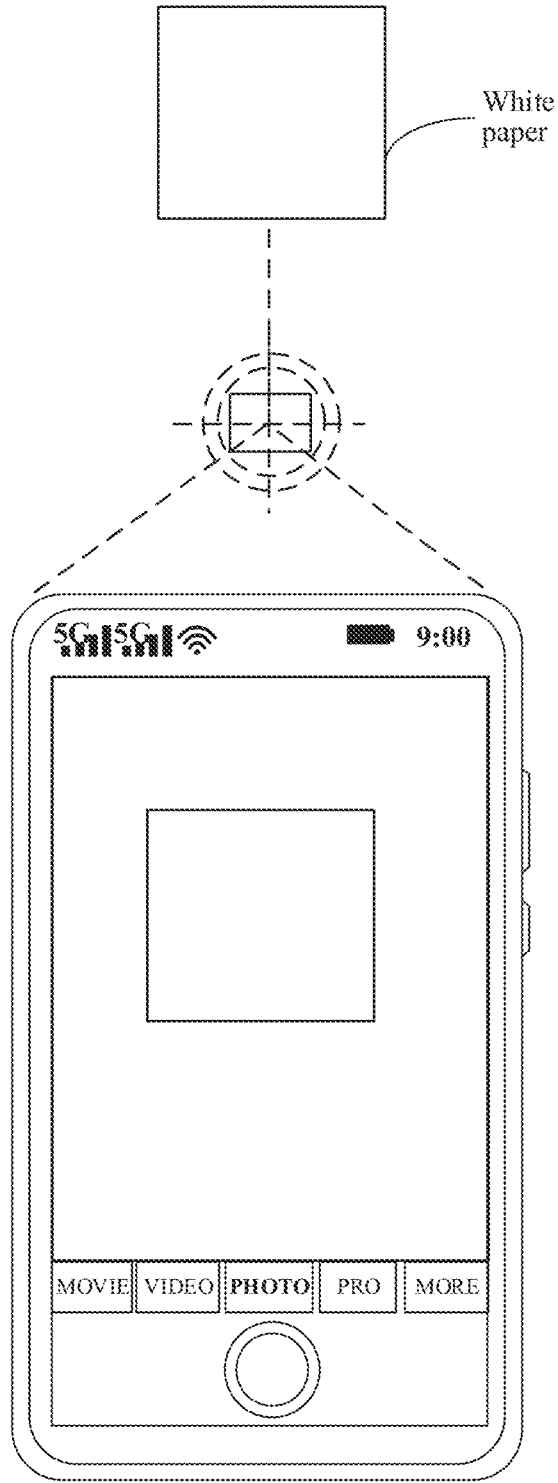

FIG. 9A and FIG. 9B are schematic diagrams of an effect of an automatic exposure method according to an embodiment of this application.

FIG. 9A is a preview image obtained through the automatic exposure method in the prior art; and FIG. 9B is a preview image obtained through the automatic exposure method provided in this embodiment of this application. From the preview image shown in FIG. 9A, it can be seen that the lightness of the preview image of the white paper is severely distorted; and compared with the preview image shown in FIG. 9A, the lightness accuracy of the preview image shown in FIG. 9B is higher. That is, by exposing the camera through the automatic exposure method provided in this embodiment of this application, the lightness accuracy of the acquired image can be improved.

Figure 10A:
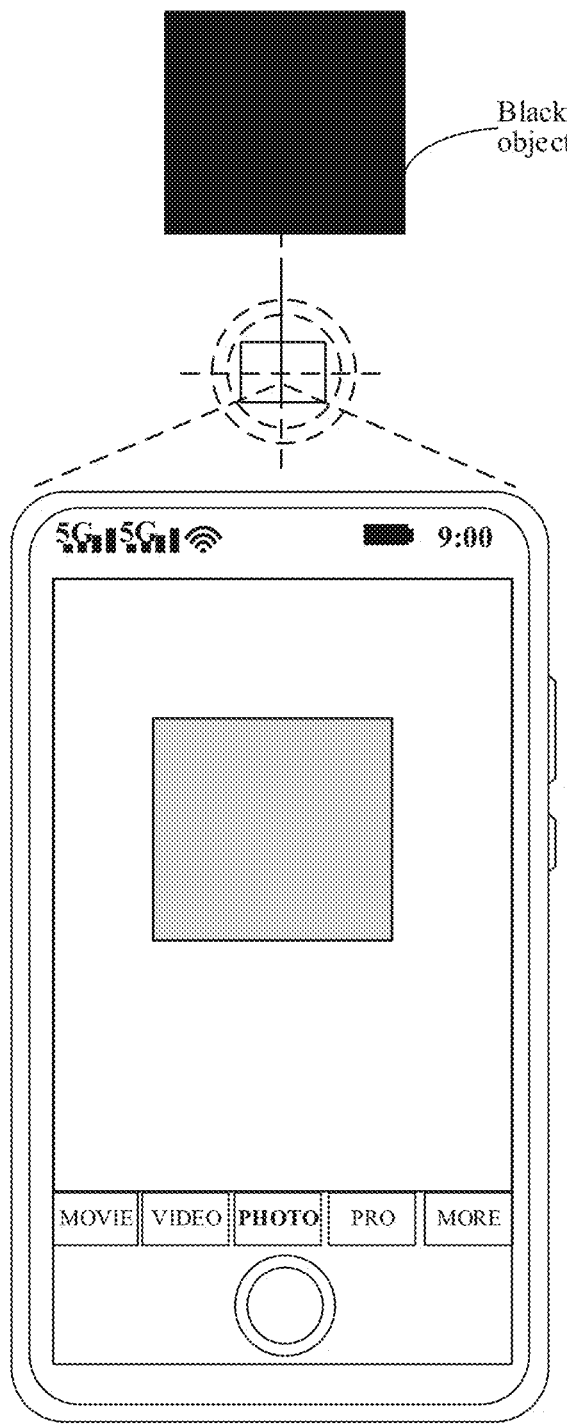
FIG. 10A and FIG. 10B are schematic diagrams of an effect of an automatic exposure method based on this application according to an embodiment of this application.
Figure 10B:
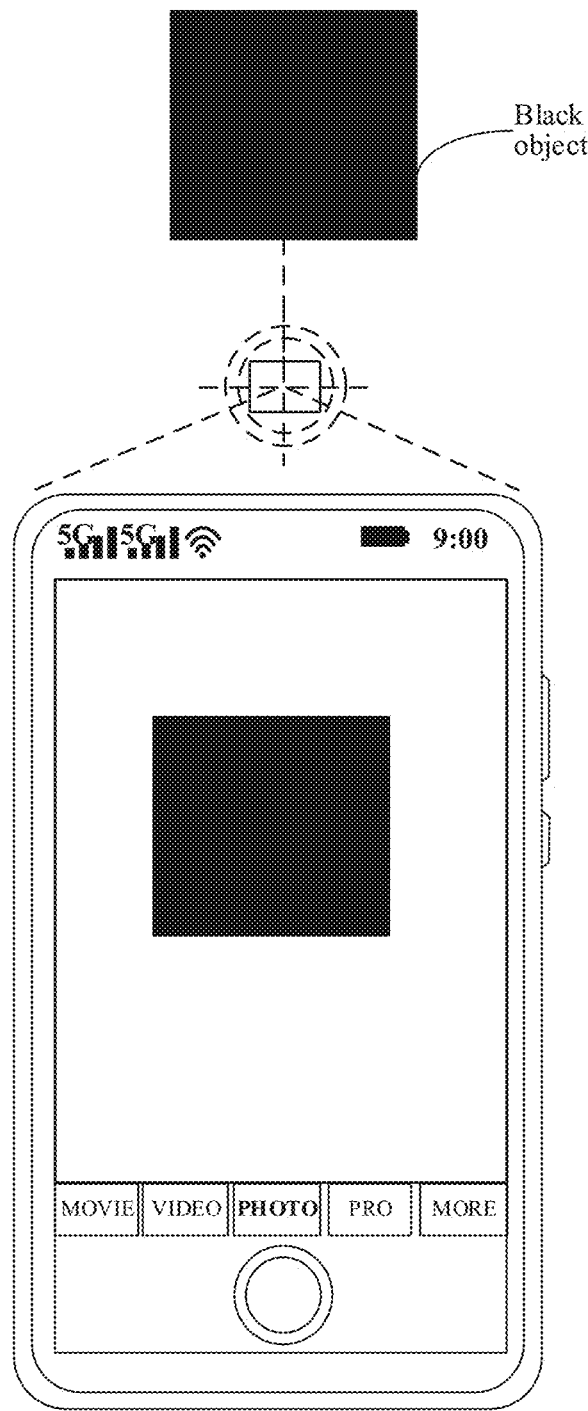

FIG. 10A and FIG. 10B are schematic diagrams of an effect of an automatic exposure method according to an embodiment of this application.

FIG. 10A is a preview image of a black object obtained through the automatic exposure method in the prior art; and FIG. 10B is a preview image of the black object obtained through the automatic exposure method provided in this embodiment of this application. From the preview image shown in FIG. 10A, it can be seen that the lightness of the preview image of the black object is severely distorted; and compared with the preview image shown in FIG. 10A, the lightness accuracy of the preview image shown in FIG. 10B is higher. That is, by exposing the camera through the automatic exposure method provided in this embodiment of this application, the lightness accuracy of the acquired image can be improved.

For example, the lightness correction mode can be enabled in the settings of the electronic device, then the electronic device can obtain the corrected exposure parameter through the automatic exposure method provided in this embodiment of this application, and expose the camera according to the corrected exposure parameter, thereby outputting an image or video acquired by the camera.

Figure 11A:
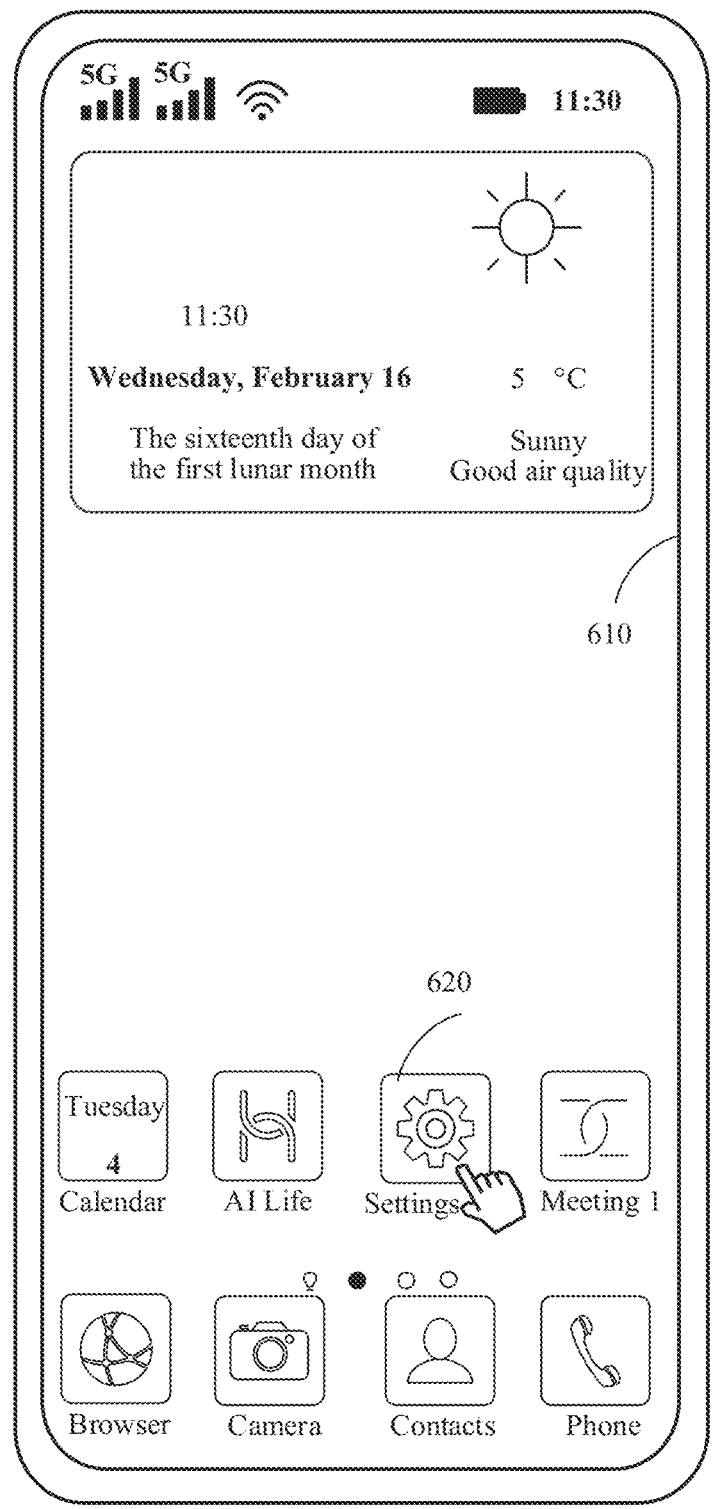
FIG. 11A, FIG. 11B, and FIG. 11C are a schematic diagram of a graphical user interface to which an embodiment of this application is applicable.
Figure 11B:
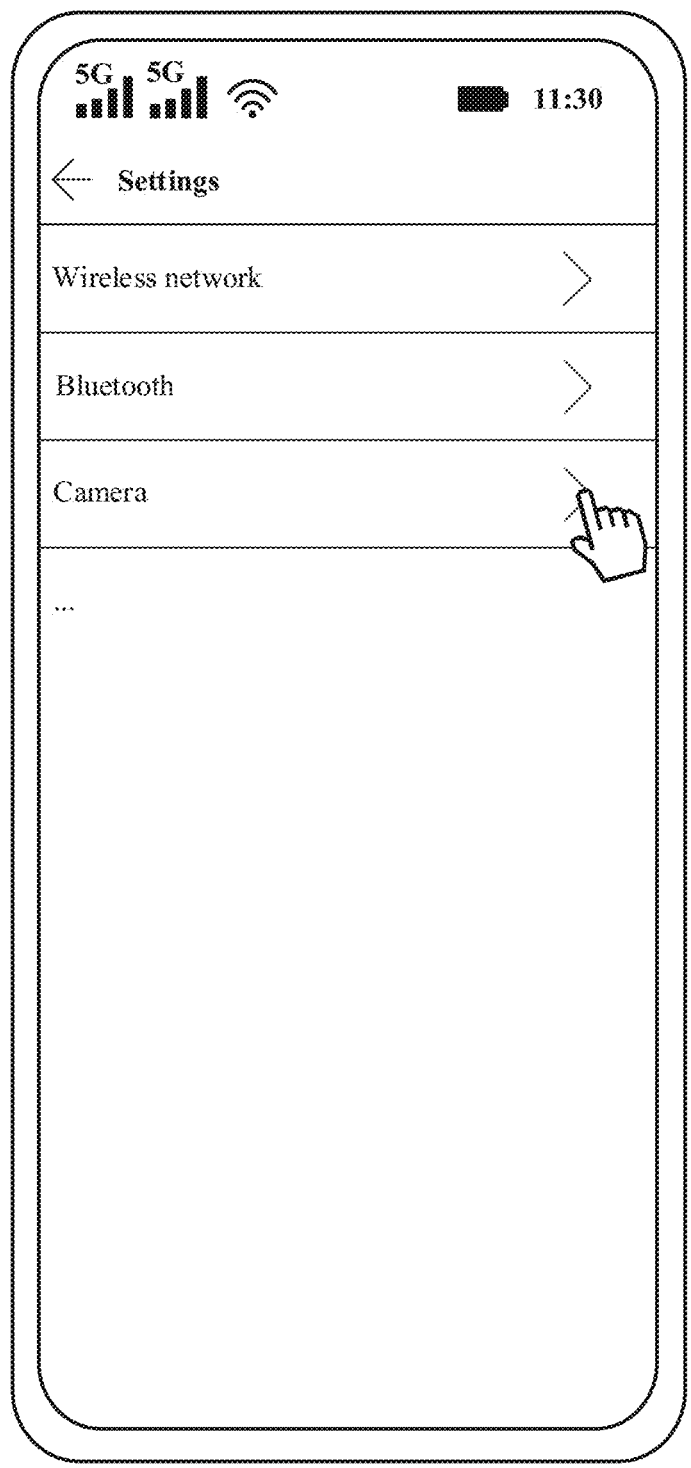
Figure 11C:
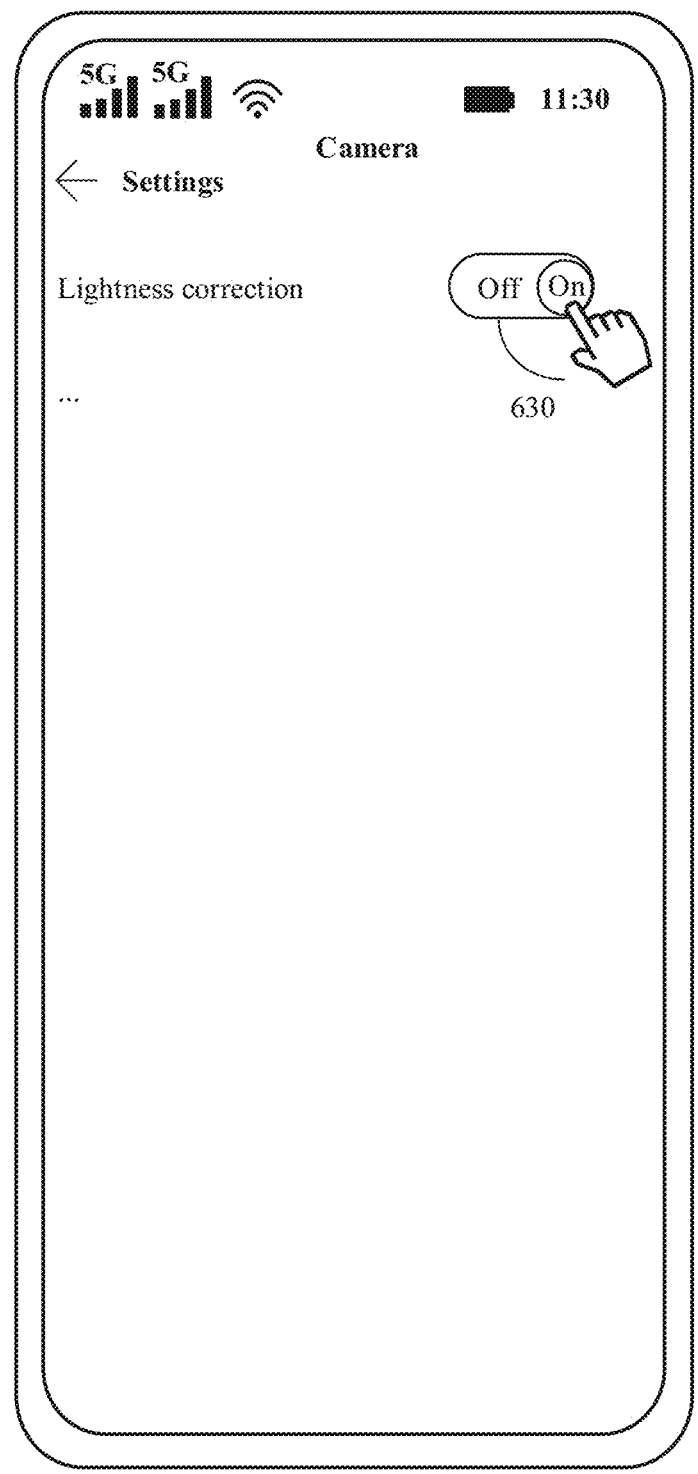

FIG. 11A, FIG. 11B, and FIG. 11C show a graphical user interface (graphical user interface, GUI) of an electronic device.

The GUI shown in FIG. 11A is a desktop 610 of the electronic device. After the electronic device detects that a user taps a settings icon 620 on the desktop 610, the electronic device may display another GUI shown in FIG. 11B. The GUI shown in FIG. 11B may be a settings display interface, and the settings display interface may include options such as wireless network, Bluetooth, or camera. After the camera option is tapped, a camera settings interface is entered. The camera settings interface is shown in FIG. 11C. The camera setting interface may include a brightness correction control 630; and after detecting an operation of clicking the brightness correction control 630 by the user, the electronic device may enable a brightness correction mode. That is, the corrected target brightness can be obtained through the automatic exposure method provided in this embodiment of this application; and the corrected exposure parameter is obtained based on the corrected target brightness, and the camera is exposed according to the corrected exposure parameter, thereby outputting the image or video acquired by the camera.

It should be understood that, the foregoing descriptions provided by using an example are intended to help a person skilled in the art to understand embodiments of this application, and is not intended to limit embodiments of this application to specific values or specific scenarios in the example. Apparently, a person skilled in the art can make various equivalent modifications or changes based on the foregoing examples, and such modifications or changes shall also fall within the scope of the embodiments of this application.

The foregoing describes in detail the automatic exposure method provided in embodiments of this application with reference to FIG. 1 to FIG. 11A, FIG. 11B, and FIG. 11C. The following describes in detail the apparatus embodiments of this application with reference to FIG. 12 and FIG. 13. It should be understood that, the apparatus in embodiments of this application may perform the methods in the foregoing embodiments of this application, that is, for specific working processes of the following products, refer to corresponding processes in the foregoing method embodiments.

Figure 12:
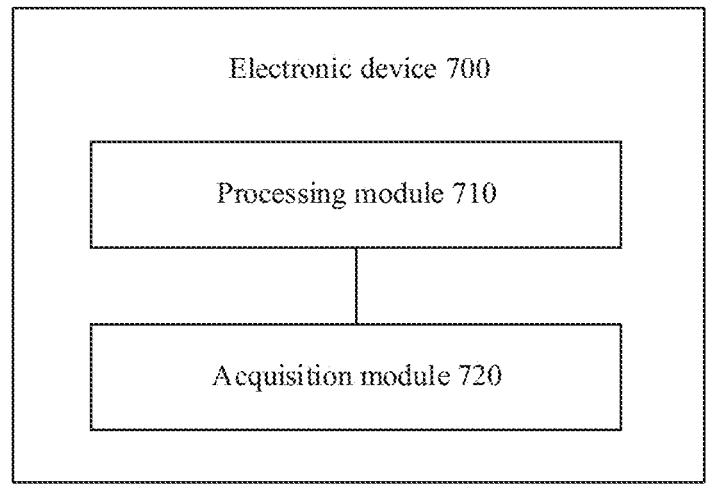
FIG. 12 is a schematic structural diagram of an electronic device according to an embodiment of this application.

FIG. 12 is a schematic structural diagram of an electronic device according to an embodiment of this application. The electronic device 700 includes a processing module 710, an acquisition module 720, a first sensor, and a second sensor. The first sensor is an image sensor, and the second sensor is a multi-spectral sensor. The processing module 710 is configured to enable a camera application; the acquisition module 720 is configured to acquire a first image and first data, where the first image is an image acquired by the first sensor based on an initial exposure parameter, the initial exposure parameter corresponds to a shooting scene in which a shot object of the electronic device is located, and the first data is response values of one or more channels of the second sensor; the processing module 710 is configured to: obtain a first target lightness of the shooting scene based on the first image; obtain a target lightness correction amount based on the first data; and adjust the first target lightness based on the target lightness correction amount, to obtain a second target lightness; and the acquisition module 720 is configured to acquire a second image, where the second image is an image acquired by the first sensor based on a target exposure parameter, and the target exposure parameter is obtained based on the second target lightness.

Optionally, in an embodiment, the processing module 710 is specifically configured to:

obtain the target lightness correction amount based on a response value of a first channel and a mapping relationship, where the first channel refers to an all-pass channel corresponding to the shooting scene, and the mapping relationship is used for representing an association between a lightness correction amount and a response value of the all-pass channel.

Optionally, in an embodiment, the first data includes the response value of the first channel.

Optionally, in an embodiment, the response value of the first channel is obtained by adding the response values of the channels.

Optionally, in an embodiment, before the adjusting the first target lightness based on the target lightness correction amount, to obtain a second target lightness, the processing module 710 is further configured to:

determine that the shooting scene remains unchanged.

Optionally, in an embodiment, the processing module 710 is specifically configured to:

acquire an average color temperature corresponding to N frames of data and a color temperature corresponding to the $N^{th}$ frame of data;

obtain a color temperature difference value based on the average color temperature corresponding to the N frames of data and the color temperature corresponding to the $N^{th}$ frame of data, where the color temperature difference value refers to a difference value between the average color temperature corresponding to the N frames of data and the color temperature corresponding to the $N^{th}$ frame of data; and determine, in a case that the color temperature difference value is less than or equal to a preset threshold, that the shooting scene remains unchanged.

Optionally, in an embodiment, the processing module 710 is specifically configured to:

obtain the color temperature corresponding to the $N^{th}$ frame of data based on the $N^{th}$ frame of data and calibration color temperature data, where the calibration color temperature data refers to response values of different channels corresponding to color temperature ranges obtained through calibration.

Optionally, in an embodiment, the target exposure parameter includes an exposure time, a light sensitivity, and/or an exposure value.

Optionally, in an embodiment, the processing module 710 is specifically configured to:

obtain the first target lightness based on statistical information of the first image, where the statistical information of the first image includes a histogram of the first image, or an average lightness value of regions of the first image.

Optionally, in an embodiment, image quality of the second image is higher than image quality of the first image.

Optionally, in an embodiment, the response values of the plurality of channels are the response values of the channels of the second sensor.

It should be noted that the electronic device 700 is embodied in a form of functional modules. The term "module" herein can be implemented in a form of software and/or hardware, which is not specifically limited.

For example, a "module" may be a software program, a hardware circuit, or a combination of the two for implementing the foregoing functions. The hardware circuit may be an application specific integrated circuit (ASIC), an electronic circuit, a processor (for example, a shared processor, a dedicated processor, or a packet processor) configured to execute one or more software or firmware programs, a memory, a combined logical circuit, and/or another suitable component that supports the described functions.

Therefore, units of examples described in embodiments of this application can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

Figure 13:
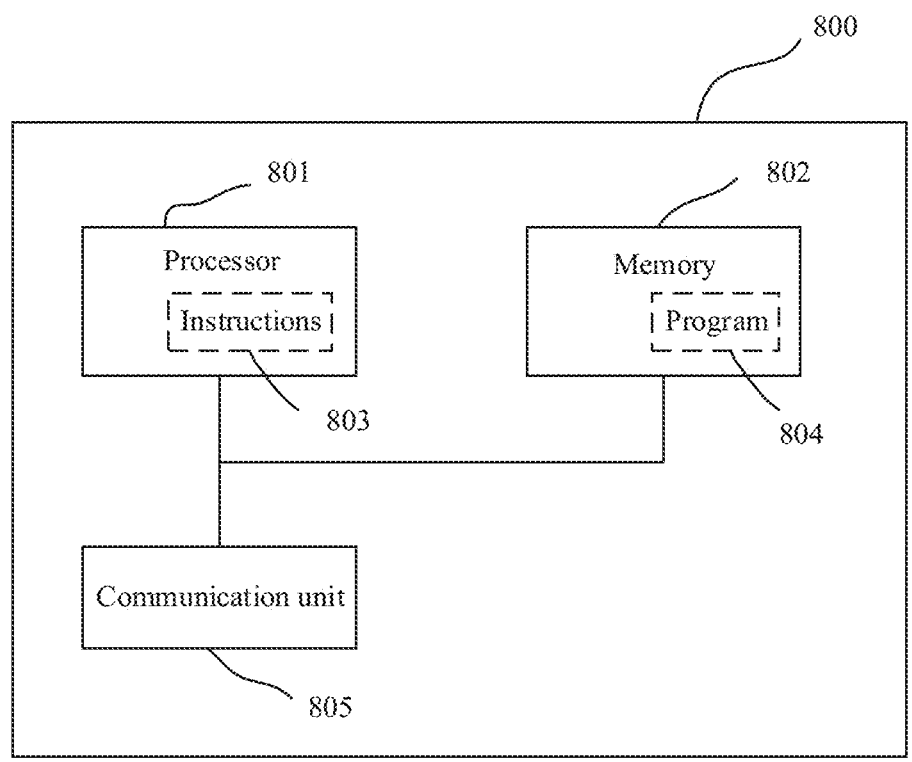
FIG. 13 is a schematic structural diagram of an electronic device according to an embodiment of this application.

FIG. 13 is a schematic structural diagram of an electronic device according to this application. A dashed line in FIG. 13 indicates that the unit or module is optional. The electronic device 800 may be configured to implement the methods described in the foregoing method embodiments.

The electronic device 800 includes one or more processors 801, and the one or more processors 801 may support the electronic device 800 to implement the automatic exposure method in the foregoing method embodiments. The processor 801 may be a general-purpose processor or a special-purpose processor. For example, the processor 801 may be a central processor (CPU), a digital signal processor (DSP), an application-specific integrated circuit (ASIC), a field-programmable gate array FPGA), or another programmable logic device such as a discrete gate or a transistor logic component or a discrete hardware assembly.

The processor 801 may be configured to control the electronic device 800, execute a software program, and process data of the software program. The electronic device 800 may further include a communication unit 805, configured to implement input (receiving) and output (sending) of a signal.

For example, the electronic device 800 may be a chip, and the communication unit 805 may be an input and/or output circuit of the chip, or the communication unit 805 may be a communication interface of the chip, and the chip may be used as a component of a terminal device or other electronic device.

In another example, the electronic device 800 may be a terminal device, and the communication unit 805 may be a transceiver of the terminal device, or the communication unit 805 may be a transceiver circuit of the terminal device.

The electronic device 800 may include one or more memories 802 on which a program 804 is stored, and the program 804 may be executed by the processor 801 to generate instructions 803, so that the processor 801 executes the automatic exposure method described in the above method embodiments according to the instructions 803.

Optionally, the memory 802 may further store data.

Optionally, the processor 801 may further read the data stored in the memory 802, where the data may be stored at a same storage address as the program 804, or stored at a storage address different from a storage address of the program 804.

the processor 801 and the memory 802 may be disposed separately or integrated together, for example, integrated on a system on chip (SOC) of the terminal device.

For example, the memory 802 may be configured to store the related program 804 of the automatic exposure method provided in the embodiments of this application, and the processor 801 may be configured to invoke, when performing automatic exposure processing, the related program 804 of the automatic exposure method stored in the memory 802 to perform the automatic exposure method in the embodiments of this application, for example: enabling a camera application in the electronic device; acquiring a first image and first data, where the first image is an image acquired by the first sensor based on an initial exposure parameter, the initial exposure parameter corresponds to a shooting scene in which a shot object of the electronic device is located, and the first data is response values of one or more channels of the second sensor; obtaining a first target lightness of the shooting scene based on the first image; obtaining a target lightness correction amount based on the first data; adjusting the first target lightness based on the target lightness correction amount, to obtain a second target lightness; acquiring a second image, where the second image is an image acquired by the first sensor based on a target exposure parameter, and the target exposure parameter is obtained based on the second target lightness; and displaying or saving the second image.

This application further provides a computer program product. When the computer program product is executed by the processor 801, the automatic exposure method according to any method embodiment of this application is implemented.

The computer program product may be stored in a memory 802, such as a program 804, and the program 804 is finally converted into an executable object file that can be executed by the processor 801 through processing processes such as preprocessing, compilation, assembly, and linking.

This application further provides a computer-readable medium which stores a computer program. When the computer program is executed by a computer, the automatic exposure method according to any one of the foregoing method embodiments of this application is implemented. The computer program may be an advanced language program, or may be an executable target program.

The computer-readable storage medium may be, for example, a memory 802. The memory 802 may be a volatile memory or a non-volatile memory, or the memory 802 may simultaneously include a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), which serves as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory DR RAM).

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

A person skilled in the art may clearly understand that, for simple and clear description, for specific work processes of the foregoing described system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the embodiment of the electronic device described above is merely illustrative. For example, the module division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit.

It should be understood that, sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

When the functions are implemented in the form of a software functional unit and sold or used as an independent product, the functions may be stored in a computer readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims. In conclusion, what are described above are merely examples of embodiments of the technical solutions of this application, but is not intended to limit the protection scope of this application. A person skilled in the art may make various modifications and changes to this application. Any modification, equivalent replacement, or improvement made without departing from the spirit and principle of this application shall fall within the protection scope of this application.

What is claimed is:

1. A method applied to an electronic device comprising an image sensor responsive to a first light spectrum and a multi-spectral sensor responsive to the first light spectrum and a second light spectrum, the method comprising:
    enabling a camera application;
    acquiring a first image and first data, wherein the first image is an image acquired by the image sensor based on an initial exposure parameter that corresponds to a shooting scene in which a shot object of the electronic device is located, wherein the first data is response values of one or more channels of the multi-spectral sensor, and wherein the first light spectrum includes visible light and the second light spectrum includes infrared light;
    obtaining a first target lightness of the shooting scene based on the first image;
    obtaining a target lightness correction amount based on the first data;
    adjusting the first target lightness based on the target lightness correction amount, to obtain a second target lightness;
    acquiring a second image by the image sensor based on a target exposure parameter that is obtained based on the second target lightness; and
    displaying or saving the second image.

2. The method of claim 1, wherein obtaining the target lightness correction amount based on the first data comprises obtaining the target lightness correction amount based on a response value of a first channel and a mapping relationship, wherein the first channel is an all-pass channel corresponding to the shooting scene, and the mapping relationship represents an association between a lightness correction amount and a response value of the all-pass channel.

3. The method of claim 2, wherein the first data comprises the response value of the first channel.

4. The method of claim 2, wherein the response value of the first channel is obtained by adding the response values of the channels.

5. The method of claim 1, further comprising determining that the shooting scene remains unchanged before adjusting the first target lightness based on the target lightness correction amount to obtain the second target lightness.

6. The method of claim 5, wherein the first data is an $N^{th}$ frame of data, and wherein determining that the shooting scene remains unchanged comprises:
    acquiring an average color temperature corresponding to N frames of data and a color temperature corresponding to the $N^{th}$ frame of data;
    obtaining a color temperature difference value based on the average color temperature corresponding to the N frames of data and the color temperature corresponding to the $N^{th}$ frame of data, wherein the color temperature difference value is a difference value between the average color temperature corresponding to the N frames of data and the color temperature corresponding to the $N^{th}$ frame of data; and
    determining, in a case that the color temperature difference value is less than or equal to a preset threshold, that the shooting scene remains unchanged.

7. The method of claim 6, wherein acquiring the average color temperature corresponding to N frames of data and the color temperature corresponding to the $N^{th}$ frame of data comprises obtaining the color temperature corresponding to the $N^{th}$ frame of data based on the $N^{th}$ frame of data and calibration color temperature data, wherein the calibration color temperature data includes response values of different channels corresponding to color temperature ranges obtained through calibration.

8. The method of claim 1, wherein the target exposure parameter comprises an exposure time, a light sensitivity, an exposure value, or a combination thereof.

9. The method of claim 1, wherein obtaining the first target lightness of the shooting scene based on the first image comprises obtaining the first target lightness based on statistical information of the first image, wherein the statistical information of the first image comprises either a) a histogram of the first image, or b) an average lightness value of regions of the first image.

10. The method of claim 1, wherein image quality of the second image is higher than image quality of the first image.

11. The method of claim 1, wherein the response values of the one or more channels are the response values of the channels of the multi-spectral sensor.

12. An electronic device, comprising:
    one or more processors;
    an image sensor coupled to the one or more processors, the image sensor responsive to a first light spectrum;
    a multi-spectral sensor coupled to the one or more processors, the multi-spectral sensor responsive to the first light spectrum and a second light spectrum, wherein the first light spectrum includes visible light and the second light spectrum includes infrared light; and
    one or more memories coupled to the one or more processors, wherein the one or more memories are configured to store instructions that, when executed by the one or more processors, cause the electronic device to be configured to:
    enable a camera application;
    acquire a first image and first data, wherein the first image is an image acquired by the image sensor based on an initial exposure parameter, the initial exposure parameter corresponds to a shooting scene in which a shot object of the electronic device is located, and the first data is response values of one or more channels of the multi-spectral sensor;
    obtain a first target lightness of the shooting scene based on the first image;
    obtain a target lightness correction amount based on the first data;
    adjust the first target lightness based on the target lightness correction amount, to obtain a second target lightness;

acquire a second image by the image sensor based on a target exposure parameter that is obtained based on the second target lightness; and display or save the second image.

13. A non-transitory computer-readable storage medium, storing instructions that, when executed by one or more processors of an electronic device, cause the electronic device to be configured to:

enable a camera application;

acquire a first image and first data, wherein the first image is an image acquired by an image sensor of the electronic device based on an initial exposure parameter that corresponds to a shooting scene in which a shot object of the electronic device is located, wherein the image sensor is responsive to a first light spectrum, wherein the first data is response values of one or more channels of a multi-spectral sensor of the electronic device, wherein the multi-spectral sensor is responsive to the first light spectrum and a second light spectrum, and wherein the first light spectrum includes visible light and the second light spectrum includes infrared light;

obtain a first target lightness of the shooting scene based on the first image;

obtain a target lightness correction amount based on the first data;

adjust the first target lightness based on the target lightness correction amount, to obtain a second target lightness;

acquire a second image by the image sensor based on a target exposure parameter that is obtained based on the second target lightness; and display or save the second image.

14. The electronic device of claim 12, wherein obtaining the target lightness correction amount based on the first data comprises obtaining the target lightness correction amount based on a response value of a first channel and a mapping relationship, wherein the first channel is an all-pass channel corresponding to the shooting scene, and the mapping relationship represents an association between a lightness correction amount and a response value of the all-pass channel.

15. The electronic device of claim 14, wherein the first data comprises the response value of the first channel.

16. The electronic device of claim 14, wherein the response value of the first channel is obtained by adding the response values of the channels.

17. The electronic device of claim 12, wherein the instructions, when executed by the one or more processors, further cause the electronic device to be configured to determine that the shooting scene remains unchanged before adjusting the first target lightness based on the target lightness correction amount to obtain the second target lightness.

18. The electronic device of claim 17, wherein the first data is an $N^{th}$ frame of data, and wherein determining that the shooting scene remains unchanged comprises:

acquiring an average color temperature corresponding to N frames of data and a color temperature corresponding to the $N^{th}$ frame of data;

obtaining a color temperature difference value based on the average color temperature corresponding to the N frames of data and the color temperature corresponding to the $N^{th}$ frame of data, wherein the color temperature difference value is a difference value between the average color temperature corresponding to the N frames of data and the color temperature corresponding to the $N^{th}$ frame of data; and determining, in a case that the color temperature difference value is less than or equal to a preset threshold, that the shooting scene remains unchanged.

19. The electronic device of claim 18, wherein acquiring the average color temperature corresponding to N frames of data and the color temperature corresponding to the $N^{th}$ frame of data comprises obtaining the color temperature corresponding to the $N^{th}$ frame of data based on the $N^{th}$ frame of data and calibration color temperature data, wherein the calibration color temperature data includes response values of different channels corresponding to color temperature ranges obtained through calibration.

20. The electronic device of claim 12, wherein obtaining the first target lightness of the shooting scene based on the first image comprises obtaining the first target lightness based on statistical information of the first image, wherein the statistical information of the first image comprises either a) a histogram of the first image, or b) an average lightness value of regions of the first image.

* * * * *